United States Patent
Woo

(10) Patent No.: US 10,503,698 B2
(45) Date of Patent: Dec. 10, 2019

(54) CONFIGURATION REPLICATION IN A SEARCH HEAD CLUSTER

(71) Applicant: Splunk Inc., San Francisco, CA (US)

(72) Inventor: Eric Woo, San Francisco, CA (US)

(73) Assignee: Splunk Inc., San Francisco, CA (US)

( * ) Notice: Subject to any disclaimer, the term of this patent is extended or adjusted under 35 U.S.C. 154(b) by 885 days.

(21) Appl. No.: 14/448,919

(22) Filed: Jul. 31, 2014

(65) Prior Publication Data

US 2016/0034490 A1 Feb. 4, 2016

(51) Int. Cl.
*G06F 16/178* (2019.01)
*G06F 16/28* (2019.01)
*G06F 16/27* (2019.01)

(52) U.S. Cl.
CPC .......... *G06F 16/178* (2019.01); *G06F 16/27* (2019.01); *G06F 16/285* (2019.01)

(58) Field of Classification Search
CPC ................ G06F 17/30174; G06F 16/178
See application file for complete search history.

(56) References Cited

U.S. PATENT DOCUMENTS

| | | | |
|---|---|---|---|
| 7,953,794 B2 * | 5/2011 | Clarke | G06F 17/2288 709/204 |
| 8,412,696 B2 | 4/2013 | Zhang et al. | |
| 8,589,403 B2 | 11/2013 | Marquardt et al. | |
| 8,682,925 B1 | 3/2014 | Marquardt et al. | |
| 9,069,607 B1 * | 6/2015 | Gopalakrishna Alevoor | G06F 9/45558 |
| 2009/0006404 A1 * | 1/2009 | Magruder | G06F 9/467 |
| 2011/0004702 A1 * | 1/2011 | Tsofi | G06F 17/30578 709/248 |
| 2012/0084341 A1 * | 4/2012 | Mantri | H04M 3/42178 709/203 |
| 2013/0191336 A1 * | 7/2013 | Ducott, III | G06F 17/30578 707/634 |
| 2013/0318236 A1 | 11/2013 | Coates et al. | |
| 2013/0318603 A1 | 11/2013 | Merza | |
| 2013/0326620 A1 | 12/2013 | Merza et al. | |
| 2014/0160238 A1 | 6/2014 | Yim et al. | |
| 2015/0227533 A1 * | 8/2015 | Goldstein | G06F 17/30377 707/661 |

OTHER PUBLICATIONS

Bitincka et al., "Experiences with Workload Management in Splunk", 2012.*
Ongaro et al., "In Search of an Understandable Consensus Algorithm", 2013.*
Zadrozny et al., "Scaling and High Availability", 2013.*

(Continued)

*Primary Examiner* — Dawaune A Conyers
(74) *Attorney, Agent, or Firm* — Lowenstein Sandler LLP

(57) ABSTRACT

Replication of search-related configuration customizations across multiple individual configuration files of search heads of a cluster for a consistent user experience. The cluster of search heads may be synchronized such that the search heads operate to receive the configuration or knowledge object customizations from one or more clients. Following synchronization, the respective search heads may display the knowledge object customizations to the one or more clients via a user interface.

28 Claims, 18 Drawing Sheets

(56) References Cited

OTHER PUBLICATIONS

Bitincka, Ledion, et al., "Optimizing Data Analysis with a Semi-Structured Time Series Database", Splunk Inc., 2010 pp. 1-9.
Carasso, David, "Exploring Splunk Search Processing Language (SPL) Primer and Cookbook", Splunk Inc., 2012 CITO Research, New York, 154 Pages.
http://docs.splunk.com/Documentation/PCI/2.1.1/ [000119] User/IncidentReviewdashboard, 2 Pages (Last accessed Aug. 5, 2014).
"vSphere Monitoring and Performance", VMware, Inc., Update 1, vSphere 5.5, EN-001357-02, 2010-2014, pp. 1-174 http://pubs.vmware.com/vsphere-55/topic/com.vmware.ICbase/PDF/vsphere-esxi-vcenter-server-551-monitoring-performance-guide.pdf.
U.S. Appl. No. 14/167,316, filed Jan. 29, 2014.
U.S. Appl. No. 14/266,812, filed Apr. 30, 2014.
U.S. Appl. No. 14/266,817, filed Apr. 30, 2014.

\* cited by examiner

```
Original Search: 501
search error | stats count BY host

Sent to peers: 502
search error | prestats count BY host

Executed by search head: 503
Merge prestats results received from peers (reduce)
```

CONFIGURATION REPLICATION IN A SEARCH HEAD CLUSTER

TECHNICAL FIELD

The present disclosure is generally related to data searching, and is more specifically related to replicating search-related configuration customizations across multiple individual configuration files for a consistent user experience.

BACKGROUND

Modern data centers often comprise thousands of hosts that operate collectively to service requests from even larger numbers of remote clients. During operation, components of these data centers can produce significant volumes of machine-generated data. The unstructured nature of much of this data has made it challenging to perform indexing and searching operations because of the difficulty of applying semantic meaning to unstructured data. As the number of hosts and clients associated with a data center continues to grow, processing large volumes of machine-generated data in an intelligent manner and effectively presenting the results of such processing continues to be a priority.

BRIEF DESCRIPTION OF THE DRAWINGS

The present disclosure is illustrated by way of examples, and not by way of limitation, and may be more fully understood with references to the following detailed description when considered in connection with the figures, in which:

FIG. 10 illustrates an exemplary search query received from a client and executed by search peers in accordance with one or more aspects of the present disclosure.

FIG. 11B illustrates a data summary dialog that enables a user to select various data sources in accordance with one or more aspects of the present disclosure.

DETAILED DESCRIPTION

Figure 1:
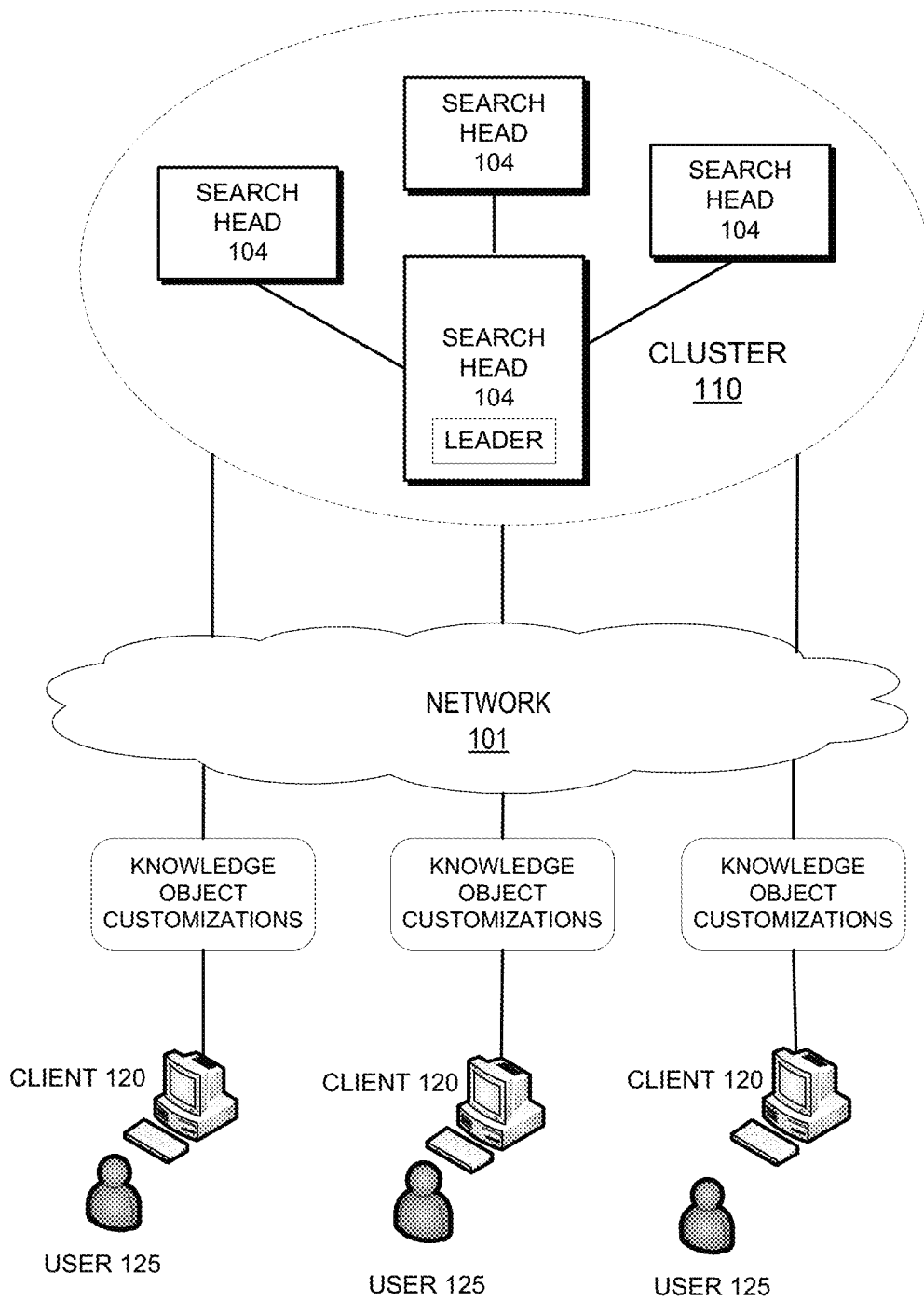
FIG. 1 schematically illustrates an example environment for replicating user-defined configuration customizations across a cluster of search heads, in accordance with one or more aspects of the present disclosure.

The present disclosure is directed to replicating knowledge object customizations across multiple search heads of a cluster. Multiple search heads of a data aggregation and analysis system are grouped together to form a cluster. A search head may refer to a component of the data aggregation and analysis system that is responsible for a reduce phase of a map-reduce search performed by the data aggregation and analysis system, as further described below. A search head may communicate with one or more indexers that are responsible for a map phase of the map-reduce search, as further described below.

An example data aggregation and analysis system may aggregate heterogeneous machine-generated data received from various sources, including servers, databases, applications, networks, etc. The aggregated source data may comprise a plurality of events. An event may be represented by a data structure that is associated with a certain point in time and comprises a portion of raw machine data (i.e., machine-generated data). The system may be configured to perform real-time indexing of the source data and to execute real-time, scheduled, or historic searches on the source data. A search query may comprise one or more search terms specifying the search criteria. Search terms may include keywords, phrases, Boolean expressions, regular expressions, field names, name-value pairs, etc. The search criteria may comprise a filter specifying relative or absolute time values, to limit the scope of the search by a specific time value or a specific time range.

The example data aggregation and analysis system executing a search query may evaluate the data relative to the search criteria to produce a search result. The search result may comprise one or more data items representing one or more portions of the source data that satisfy the search criteria. The search result that is produced by the search query can include data derived using a late binding schema. A late binding schema is described in greater detail below. Search results returned in response to search queries can be presented to users via dashboards and other graphical user interfaces (GUIs).

Users can customize the search-related behavior of the system (e.g., by specifying interesting fields, event types and transactions, lookups and workflow actions, etc.) and the visualization behavior of the system (e.g., how to present the search results). In some embodiments, the users may customize the search-related and visualization behavior of the system by submitting a command, instruction, or request for a customization of a knowledge object (also referred to as a "knowledge object customization"). A knowledge object is a configuration relating to search activity and/or visualization that is permissionable and controlled via an access control layer of the system that is customizable by a user. Exemplary knowledge objects include, but are not limited to, late-binding schema, a saved search, an event type, a transaction, a tag, a field extraction, a field transform, a lookup, a workflow action, a search command, and a view, which are discussed in more detail below. A customization may include any action operation relating to a knowledge object, such as, for example, the deletion of a knowledge object, editing of a knowledge object, sharing of a knowledge object, setting of permissions relating to of a knowledge object, creation of a knowledge object, modification of a knowledge object, changing of a knowledge object, or updating of a knowledge object. In operation, a user's device ("a client") interacts with one of the search heads of the cluster to submit one or more commands, instructions, or requests for configuration customizations to the search head. In the cluster, one of the search heads operates as a "leader" or "captain" responsible for communicating with the other search heads in the cluster.

The search head performs and stores the knowledge object customization in a local data store (e.g., stored on a local disk or in memory of the individual search head.) In an embodiment, the search head is configured to present the stored knowledge object customizations to the clients 120 via a suitable user interface. FIG. 1 illustrates the presentation and/or display of the knowledge object customizations by the search heads 104 in the cluster 110 to the clients 120. In an embodiment, the search head maintains a journal including a record of one or more knowledge object customizations submitted by the clients. In response to receiving a knowledge object customization from a client, the search head adds a journal update to the journal maintained in the local data store. The search head applies the knowledge object customization by writing the knowledge object customization to a local configuration file maintained in the local data store.

During a synchronization phase, a search head in the cluster receives one or more knowledge object customization commits from the search head leader. The knowledge object customization commits represent knowledge object customizations made by other search heads in the cluster that have been reported to and recorded by the search head leader. In addition, during the synchronization phase, the search head sends one or more journal updates from its locally stored journal to the search head leader for replication to the other search heads in the cluster. Eventual consistency is achieved with respect to replication of knowledge object customizations across the cluster of search heads, such that changes on one search head appear on all search heads. Accordingly, the cluster achieves a consistent overall configuration across all of the search heads of the cluster. In addition, the cluster is able to provide a consistent search behavior and a consistent visualization experience to users, even as configurations are altered on individual members of the cluster.

FIG. 1 presents a functional block diagram of a distributed system 100. The system 100 includes a cluster 110 of multiple search heads 104 accessible by a number of clients 120 over a network 101. Although FIG. 1 illustrates an example including four search heads 104 and three clients 120, it is to be appreciated that the system 100 may include any number of search heads 104 and any number of clients 120.

The search heads 104 may be, for example, server devices located at one or more sites, each site being geographically remote from the other site (e.g., in different cities). In an embodiment, all of the search heads 104 may be located at a single site. In another embodiment, at least two of the search heads 104 are located at a single site and at least one other of the search heads 104 of the cluster 110 is located at a different site. In another embodiment, each search head 104 of the cluster 110 is located at a different site.

The search heads 104 may receive instructions to perform tasks from the clients 120 on behalf of one or more users 125. For example, one of the search heads 104 may receive a request from one of the clients 120 to perform a search-related activity, such as a map-reduce search and/or a search using late-binding schema as described in detail below. In response to receiving the request to perform the search-related activity, the search head 104 may perform the search.

According to embodiments of the present disclosure, the search heads 104 may receive instructions from the clients 120 to perform a knowledge object customization (i.e., a customization of a search-related and/or visualization-related configuration). A customization may include any action relating to a knowledge object, such as, for example, the deletion, creation, modification, change, or update of a knowledge object. A knowledge object is a configuration relating to search and/or visualization activity that is permissionable and controlled via an access control layer of the system that is customizable by a user. Exemplary knowledge objects include, but are not limited to, a saved search, an event type, a transaction, a tag, a field extraction, a field transform, a lookup, a workflow action, a search command, a view, and late-binding schema. Although various exemplary knowledge objects are described below, it is noted that other knowledge objects (search-related or visualization-related configurations) may be customized in accordance with embodiments of the present disclosure.

In an embodiment, a view is a knowledge object representing a customizable user interface accessible by a user 125. In an embodiment, dashboards and forms are examples of views. In an embodiment, a view may be built from user interface components such as search boxes, fields, charts, tables, and lists. A view may be permissionable and may be applied to specific application. A dashboard may be a static or dynamic (e.g., real-time) visualization of data. In an embodiment, a view may defined via user-specified HTML, "custom" XML formats, or the like.

In an embodiment, a saved search is a knowledge object representing a search that has been made available for later use. For example, searches may be saved for producing a report, an alert or a dashboard panel.

In an embodiment, an event type is a knowledge object that enables a user to categorize and label all indexed events that match a specified search string (e.g., a search query or search criteria). An event type may have a name and an associated search query or search criteria. A user may create an event type directly or use a device to identify and create an event type. For example, the user may use a device such as a typelearner (i.e., a utility that helps a user create event types, examines events resulting from a search, and suggests event types), an event type finder (i.e., a 'findtypes' command may be appended to a search to cause the search results to display as a breakdown of the most common groups of events found in the search results), or an event type builder (i.e., a utility or tool configured to dynamically create event types based on an analysis of a selected event).

In an embodiment, a transaction is a knowledge object representing a group of conceptually-related events that span time. For example, events grouped together by a transaction often represent a complex, multistep business-related activity, such as all events related to a single hotel customer reservation session, or a customer session on a retail website. A user may use a 'transaction' command to find transactions based on a transaction definition (e.g., a transaction definition created by the user ad hoc) or to locate transactions based on a previously configured transaction type. In an embodiment, boundaries for transactions may be explicitly timespan-related, such as, for example, a transaction definition that requires that the first and last events in the transaction be no more than 30 seconds apart and the events within the transaction be no more than 5 seconds apart. In an embodiment, transaction boundaries may be defined without explicitly setting maximum timespans or event pauses. For example, a user may define a transaction for an online store called "item purchase" that looks for groups of events that share the same 'sessionid' and 'clientip' field values, have a starting event with the string "signon", and an ending event with the string "purchase." This exemplary transaction produces grouping of events that spans time.

In an embodiment, a tag is a knowledge object that enables a user 125 to efficiently search for events that contain particular field values. In an embodiment, a user 125 can assign one or more tags to any field/value combination, including, for example, event types, hosts, sources, and source types. In an embodiment, tags enable the user 125 to track abstract field values like IP addresses or ID numbers. For example, a user 125 may have a number of field values related to the user's home office, including an IP address such as 192.168.1.2. In this example, the user 125 may tag these values "homeoffice" and then perform a search on "tag=homeoffice" to identify the events with field values that have the homeoffice tag.

In an embodiment, tags enable a user 125 to group sets of related field values together. For example, if a user 125 has two hosts that relate to the same computing device, the user 125 may assign the two computing devices the same tag to allow the user 125 to search on events coming from both hosts using the common tag.

In an embodiment, tags enable a user 125 to assign extracted fields multiple tags that reflect different aspects of their identity. Accordingly, the user 125 may create tag-based searches that use boolean operators to narrow down on specific event sets.

In an embodiment, a field extraction is a knowledge object representing both a process by which fields are extracted from event data and the results of the extraction process (i.e., extracted fields). In an example, field extraction may take place either before events are indexed (e.g., in the case of default and indexed fields) or after event indexing (e.g., in the case of search fields). In an embodiment, a set of default fields may be automatically extracted for each indexed event. In an example, a user 125 may "create" additional "custom" fields by defining additional index-time and search-time field extractions. A user 125 may perform manual field extraction through the use of search commands, an extraction tool (e.g., interactive field extractor configured to enable a user 125 to create custom fields dynamically while searching), and configuration files. A late-binding schema includes such field extractions, as each one may define a particular field and how to determine a value for the field from the events for which the field is defined.

In an embodiment, a transform or field transform is a knowledge object representing a transformation of an event. For example, a field transform may be used for an advanced type of search-time field extraction wherein a user 125 wants to perform one or more of the following: (i) use the same regular expression across multiple source types, sources, or hosts; (ii) perform special formatting on the extracted field values; and (iii) extract fields from the values of another key field. In an embodiment, a transform may be involved in the setup of custom index-time field extractions. In an embodiment, a user 125 may create transforms that mask sensitive data in events, such as customer credit card numbers. A transform may be involved in the creation of a lookup, as well as overrides of default host and source type values. In an additional example, a transform may be used to route event data to alternate indexes and forward raw event data to a third-party system.

In an embodiment, a lookup is a knowledge object that enables the addition of fields and related values to search results based on field matching (e.g., using a CSV table or a Python script). For example, a user 125 may use a lookup to perform DNS or reverse DNS lookups on IP addresses or host names in the user's data. In an embodiment, a lookup may be incorporated into a dashboard or other application views presented by the system.

In an embodiment, a workflow action is a knowledge object that enables interactions between indexed fields in events and other web resources, including external web resources. For example, a workflow action may be defined to be associated with an IP address field in a user's search results or used to perform an external WHOIS lookup based on a particular value of that field in a specific event. In another example, a workflow action may be defined to use the field values in an HTTP error event to create a new entry in an external issue tracking system. In a further example, a workflow action may be defined to perform an external search (e.g., using a third party search engine or other web application) on the value of a field in an event. In another example, a workflow action may be defined to launch secondary searches that use one or more field values from selected events.

In an embodiment, a workflow action may be defined that is targeted to events that contain a particular field or set of fields, or which belong to a specific event type. A workflow action may be defined to open either in the current window or a new one when selected. In an embodiment, a workflow action may appear in field menus, event menus, or both (e.g., in search results).

In an embodiment, a search command or command is a knowledge object representing an element of search language used to interact with data maintained by the system. The search language may define many commands that allow a user 125 to interact with the system and refine and modify search results. Examples of search commands include, but are not limited to, "stats," "sort," and "where". In an embodiment, a user 125 may expand upon the system's default search language by creating custom search commands that carry out specialized interactions.

Figure 2A:
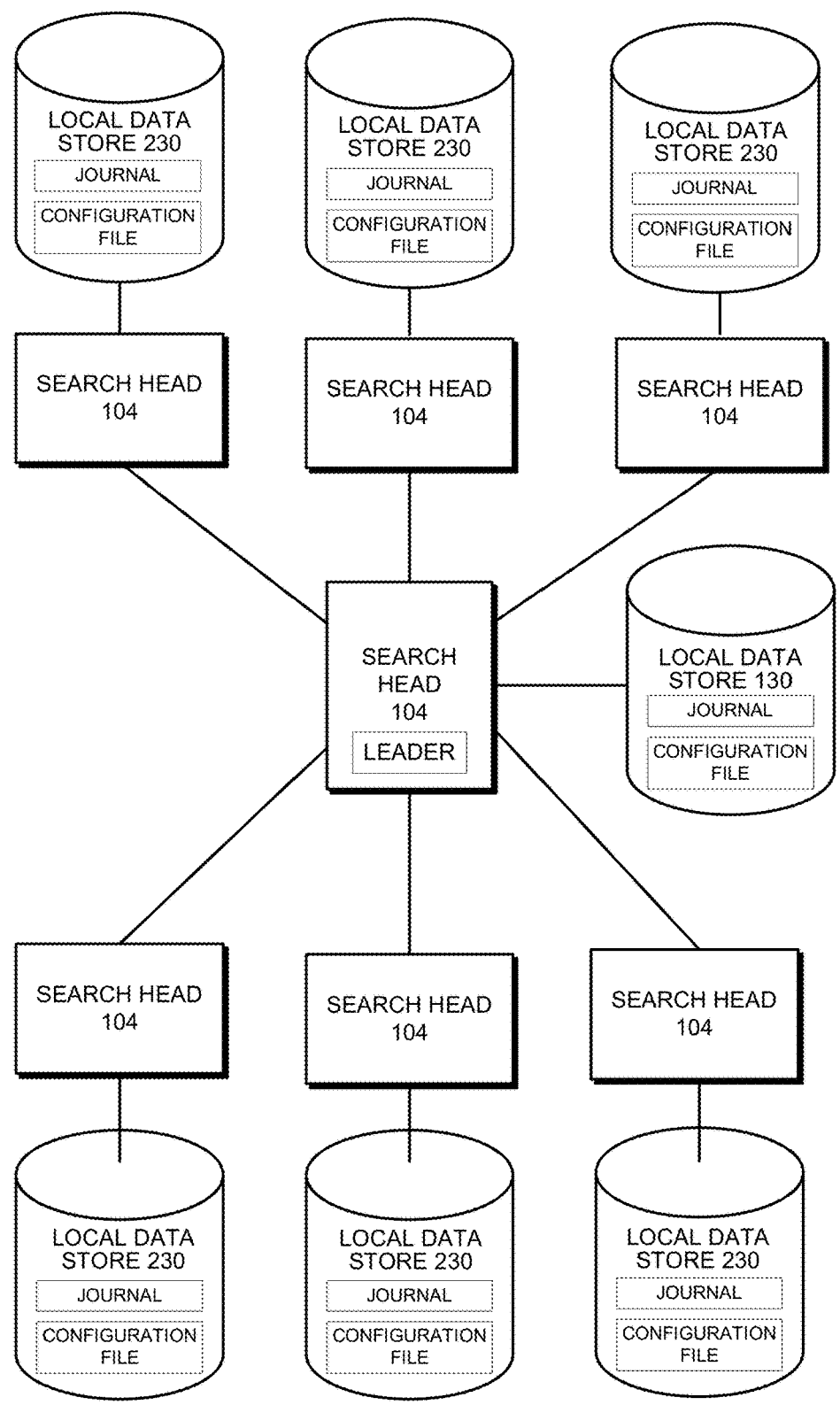
FIG. 2A schematically illustrates an example cluster of search heads each including a local data store storing a journal and configuration file, in accordance with one or more aspects of the present disclosure.

FIG. 2A illustrates an example cluster of search heads 104 each including a local data store 230 storing a journal and configuration file, in accordance with one or more aspects of the present disclosure. In an embodiment, a configuration file (also referred to as a "conf file") is a file containing system configuration information including, but not limited to, knowledge objects and knowledge objects customizations. In an embodiment, a search head 104 writes configuration settings (e.g., knowledge object customizations) into its respective configuration file stored in the local data store 230 of the individual search head.

In an embodiment, configuration replication is performed to synchronize the data structures of the multiple configuration files of the individual search heads across the cluster of search heads such that changes (e.g., user-initiated knowledge object customizations) made on one search head are applied on all search heads in the cluster. In an embodiment, a user interface enabling a user to perform search-related activities, submit knowledge object customizations and interact with the search heads of the cluster may be provided. Advantageously, knowledge object customization and corresponding change or alteration to an individual configuration file of one search head may be presented to a user via the user interface of another search head in the cluster.

In an embodiment, knowledge object customizations made via the user interface associated with an individual search head (e.g., a Command Line Interface (CLI), a Representational State Transfer (REST) application programming interface (API), etc.) are journaled or recorded in a journal maintained in a local data store 230 of the individual search head. In an embodiment, the journal is in-memory or on-disk and stored in the local data store 230 repository including a history of knowledge object customizations (e.g., a list of recent configuration customization operations) performed by the corresponding search head, wherein each knowledge object customization is recorded as a journal entry. For example, each journal entry includes information relating to the knowledge object customization, including, but not limited to, a knowledge object location (e.g., user/application context, asset type, asset name, etc.), a knowledge object customization type or action (e.g., creation, modification, move, edit, remove, delete, share, change permissioning, etc.), and a knowledge object customization payload (e.g., a key-value pair relating to the creation of a new knowledge object customization, a new location relating to a moving of a knowledge object customization, a new access control list relating to a sharing/permission change).

In an embodiment, a knowledge object customization made by an individual search head 104 is recorded as a journal entry in the journal stored in the local data store 230 of the individual search head. The individual search head 104 writes the knowledge object customization to its local configuration file stored in the local data store 230.

During a synchronization phase including a "pull" stage and a "push" stage, an individual search head communicates with the search head leader, as described in detail below with reference to FIGS. 3-5. During the "pull" stage, the individual search head receives any knowledge object customization updates from the search head leader. During the "push" stage, the individual search head sends any new journal entries to the search head leader. In an embodiment, the new journal entries include any journal entries that have not yet been sent to the search head leader.

According to embodiments of the present disclosure, the cluster of search heads (e.g., the cluster of search heads 104 shown in FIG. 2) is configured to operate such that one of the search heads 104 is designated the "leader" and has authority to issue commands to other "follower" search heads and make decisions regarding the system. As illustrated in FIG. 1, the exemplary cluster 110 including the multiple associated search heads 104 is configured in a hub-spoke arrangement, wherein one of the multiple search heads 104 is elected as the "leader". In an embodiment, the other search heads 104 in the cluster engage in intra-cluster communications exclusively with the search head leader 104 (i.e., there is no follower-to-follower search head communication). It is to be appreciated that the hub-spoke arrangement represents one exemplary topology and other suitable topologies may be employed in accordance with the present disclosure.

In an embodiment, each search head 104 may be either in a leader state or a follower state. In the leader state, the search head leader 104 is responsible for synchronizing the knowledge object customizations across the cluster of search heads 104. In the follower state, each individual search heads 104 receives updates regarding knowledge object customizations performed by other search heads 104 in the cluster and sends updates regarding knowledge object customizations performed by the individual search head 104.

In an embodiment, a search head 104 may be elected as the leader according to a leader selection process, such as, for example, according to a Raft consensus algorithm, described in detail below in connection with FIG. 2B. The Raft consensus protocol is further described in "In Search of Understandable Consensus Algorithm (Extended Version)" by Diego Ongaro and John Ousterhout, Stanford University, 2014, which is hereby incorporated herein by reference in its entirety for all purposes. In an embodiment, a consensus algorithm generates a consensus in which each of the search heads 104 agrees upon a single data value, e.g., the identity of a search head leader.

During operation of the distributed system, time may be partitioned into terms. During each term, the search heads 104 attempt to elect a leader and, if a leader is elected, operate in the asymmetric mode. A term may begin during system initiation or when a search head acting as the leader fails or is otherwise non-responsive (such as a network communication failure). Each search head may store a numeric value identifying the current term (e.g., 1, 2, ... N). This current term value may be stored in non-volatile memory such that when a server fails and is restarted, the search head may access the current term value. During each term, each search head may cast a single vote to elect one of the search heads as a leader. Thus, each search head may store, along with the current term value, an identifier of a search head for which the search head has voted to be a leader during the current term. The identifier may be stored in association with the current term value in non-volatile memory.

Figure 2B:
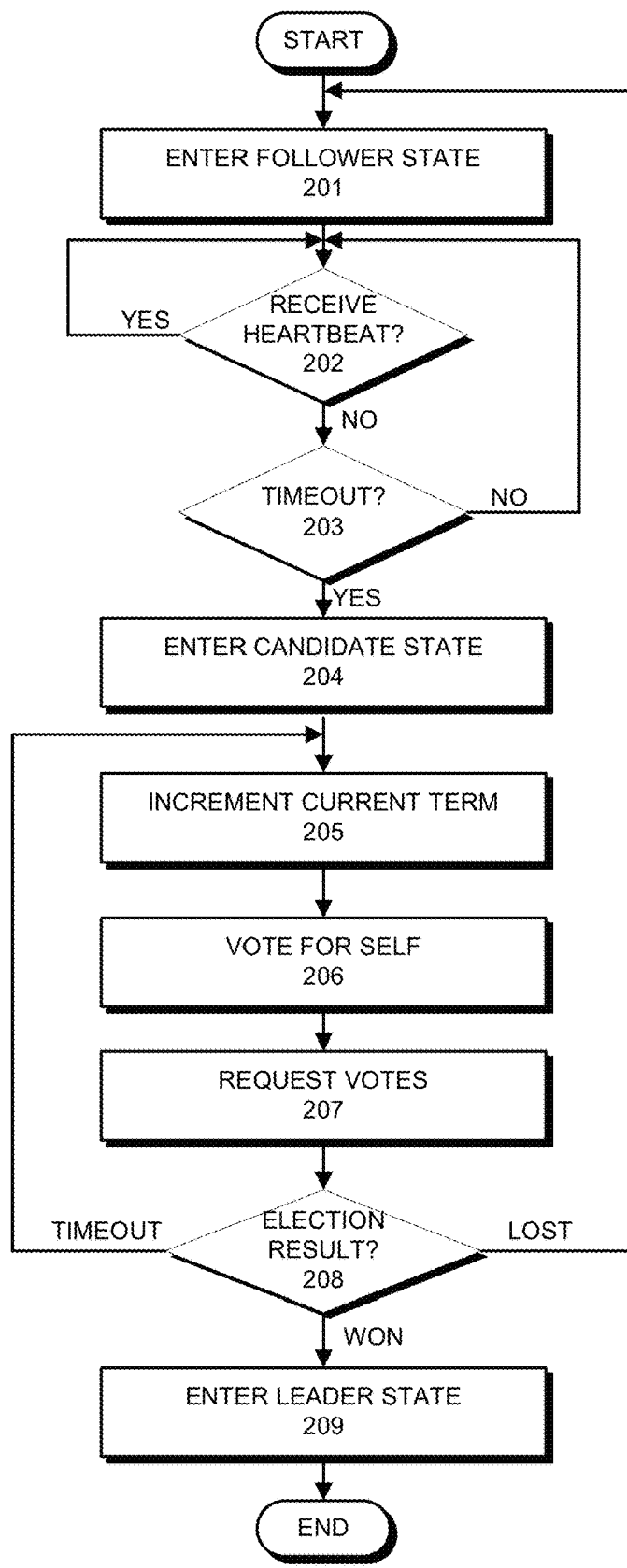
FIG. 2B presents a flowchart illustrating how a search head operates in a cluster to elect a search head leader, in accordance with one or more aspects of the present disclosure.

FIG. 2B presents a flowchart illustrating how a search head operates in a distributed system to elect a leader. When a search head is initialized, the search head starts in the follower state in block 201. The search head may be initialized when the distributed system is initialized. The search head may also be initialized because it has joined an existing distributed system or it failed and has been restarted. If a leader has been elected, the leader sends out periodic heartbeat messages to maintain its authority. The heartbeat messages may be transmitted approximately every 150 milliseconds. The heartbeat messages serve to inform the other search heads that the leader is operational. Accordingly, heartbeat messages may, in some circumstances, not be sent to a search head if the leader is sending other messages to the search head, which server to inform the search head that the leader is operational.

Thus, in the follower state, the search head expects to receive heartbeat messages from a leader on a periodic basis. If a period of time passes without the search head receiving a heartbeat message from a leader, referred to as a heartbeat timeout, the search head may begin an election process to elect a new leader. Thus, at block 202, the search head determines whether a heartbeat message has been received.

If a heartbeat message has been received, the search head returns to block 202 to await another heartbeat message. If a heartbeat message has not been received, the search head continues to block 203 where it determines whether a heartbeat timeout has occurred. The heartbeat timeout may be randomly selected by the search head between a first value and a second value. For example, the heartbeat timeout may be selected by the search head as any value between 100 and 500 milliseconds. By randomly selecting a heartbeat timeout, each search head decides to begin the election process at a different time, preventing all of the search heads simultaneously transitioning to candidate state and requesting votes (as described below).

If the search head determines, at block 203, that a heartbeat timeout has not occurred, the search head returns to block 202 and awaits a heartbeat message. If the search head determines that a heartbeat timeout has occurred, the search head continues to block 204 where it enters the candidate state.

Once in the candidate state, the search head increments (e.g., by 1) the current term value stored in memory (at block 205), votes for itself (at block 206), and requests votes from the other search heads in the distributed system (at block 207). The search head may vote for itself by associating its own identifier with the updated current term value in non-volatile memory. The search head may request votes from the other search heads by transmitting messages to the other search heads including, among other things, the incremented current term value and the identifier of the transmitting search head.

Each search head, upon receiving a request for a vote, may respond to the requesting search head. If the receiving search head has not yet voted for another search head in the term indicated by the request, the receiving search head may vote for the requesting search head by storing the requesting search head's identifier in memory in association with the term value and sending a response to the requesting search head indicating that the receiving search head has cast its vote for the requesting search head. If the receiving search head has already voted for another search head, as indicated by another search head's identifier stored in the receiving search head's memory in association with the term value that matches the term value in the request, the search head may send a response to the requesting search head indicating that the request is denied.

At block 208, the search head determines the election results. If the search head receives a majority of votes, the election is won and the search head continues to block 209 where it enters into the leader state. The search head may determine that it has received a majority of the votes when the number of responses from other search head (plus one for its own vote for itself) is greater than half the number of search head in the distributed system. Once in the leader state, the search head sends out heartbeat messages to the other search heads, thereby indicating that it has taken on the leadership role. The other search heads may respond by sending heartbeat acknowledgement signals back to the leader. In one embodiment, if the search head does not receive heartbeat acknowledgment signals from at least a majority of the search heads in the distributed system, the search head abdicates its leadership role by transitioning to the follower state, returning to block 201.

If the search head receives a heartbeat message from another search head indicating that the other search head has transitioned to the leader state, the election is lost and the search head returns to block 201 where it enters into the follower state.

If a period of time elapses without the search head receiving a majority of votes or receiving a heartbeat message indicating that another search head has become the leader, referred to as an election timeout, the search head returns to block 250 where another term is begun and the election process begins again. An election timeout may occur when multiple search heads have transitioned to the candidate state and votes are split such that none of the search heads receives a majority of the votes. The election timeout may be the same as the heartbeat timeout or a different value. In an embodiment, the election timeout is randomly selected between 100 and 500 milliseconds.

It is noted that the above-described Raft consensus protocol represents an example embodiment in accordance with the present disclosure. Other protocols may employed, such as, for example, a statically-configured hub-and-spoke arrangement, an arrangement including a per-site hub with inter-hub communication across multiple sites, another dynamically-elected hub-and-spoke arrangement, etc.

Figure 3:
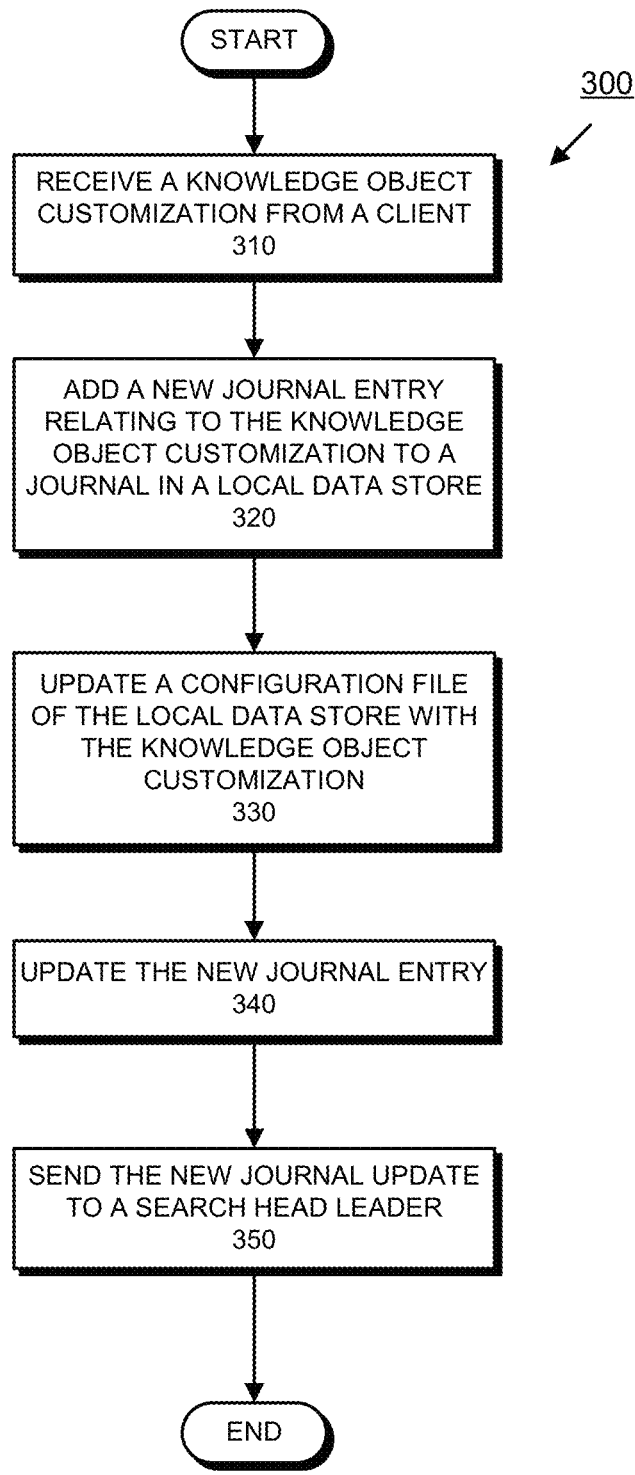
FIG. 3 presents a flowchart illustrating how a search head communicates a configuration customization applied at a local configuration file to a search head leader, in accordance with one or more aspects of the present disclosure.

FIG. 3 presents a flowchart depicting an exemplary method 300 illustrating how an individual search head processes a knowledge object customization in accordance with the disclosed embodiments. At block 310, a search head receives a knowledge object customization from a client device. In block 320, the search head generates a new journal entry including information relating to the knowledge object customization and adds the journal entry to a journal stored in a local data store of the search head. In an embodiment, after adding the journal entry, the search head may mark the journal entry as "replicated but not applied." In an embodiment, the marking "replicated but not applied" may represent that the corresponding knowledge object customization has been added to the search head's journal, but not yet added or applied to the search head's configuration file.

In block 330, the search head updates a configuration file (stored in the local data store of the search head) with the knowledge object customization. In an embodiment, the search head updates the configuration file by applying the journal entry. For example, if the journal entry relates to a knowledge object customization involving a deletion of the knowledge object, the search head deletes the respective knowledge object from the configuration file. In another example, if the journal entry is the knowledge object customization involving a creation of the knowledge object, the search head adds the respective knowledge object to the configuration file. In yet another example, if the journal entry is the knowledge object customization involving a modification to the knowledge object, the search head modifies the respective knowledge object in the configuration file. In an embodiment, in block 340, the search head may update the corresponding journal entry in the locally stored journal by marking it as "replicated and applied." Next, if the search head is a follower search head, in block 350, during the "push" stage of the synchronization phase, the search head sends a journal update including the journal entry to a search head leader.

In an embodiment, blocks 320, 330, and 340 may be performed in any order, such that the activity relating to the journal entry (e.g., creating the journal entry, updating the journal entry, etc.) may be performed before, after, or concurrently with the updating of the configuration file. For example, in an embodiment, the search head may first update the configuration file with the knowledge object customization. Following or concurrently with the update to the configuration file, the search head may generate the new journal entry including information relating to the knowledge object customization and add the journal entry to a journal stored in a local data store of the search head. In this embodiment, the search head may record only "complete" changes (i.e., changes that have been applied and reflect in the configuration file.

In an example implementation of method 300, a first search head (referred to as "search head 1") receives instructions relating to a knowledge object customization. In this example, the knowledge object customization involves the creation of a new saved search (referred to as "saved search A"). In an embodiment, search head 1 generates a globally unique identifier (herein "G1") identifying the creation of saved search A. Search head 1 then adds a journal entry (herein "J1") including information relating to G1 (e.g., the knowledge object customization identifier (G1), a parent commit or change associated with the current journal entry, information identifying the user that created G1, relevant key-value pairs, etc.) to a journal stored in a local data store of search head 1. In an embodiment, a parent commit or change represents a latest or most recent change received from the search head leader and replicated in a search head's journal. Search head 1 updates a configuration file stored in the local data store by writing saved search A to the configuration file. Next, during the push stage, search head 1 sends journal entry J1 to the search head leader.

Figure 4:
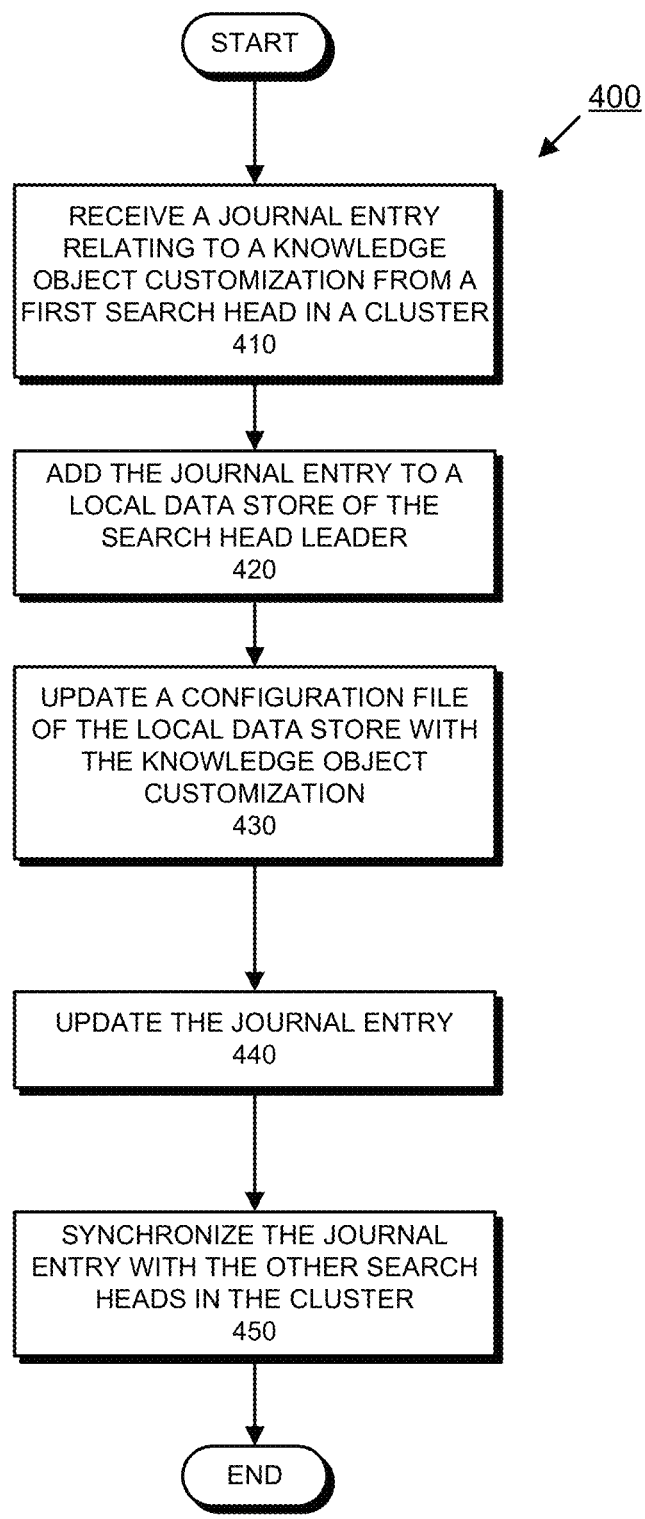
FIG. 4 presents a flowchart illustrating how a search head leader synchronizes a configuration customization across a cluster of search heads, in accordance with one or more aspects of the present disclosure.

FIG. 4 presents a flowchart depicting an exemplary method 400 illustrating how a search head leader manages replication of knowledge objects across multiple follower search heads in a cluster during a synchronization phase. In block 410, a search head leader receives a journal update including a new journal entry (e.g., journal entry J1) relating to a knowledge object customization from a first search head in a cluster. In an embodiment, the search head leader confirms that the received journal entry may be "applied cleanly" by confirming that a parent commit or change associated with the journal entry is the latest or most commit in the search head leader's journal. If the received journal entry refers to a parent commit which is the latest commit recorded in the search head's journal, the search head leader may determine that there are no intervening journal updates (i.e., from other search heads in the cluster) creating a potential merge conflict. In an embodiment, the search head leader "reconciles" the journal entry and determines there is no conflict with another journal entry received from another follower search head by confirming the parent commit (or journal entry) reference in the journal entry received from the follower search head is the latest (e.g., most current) journal entry in the search head leader's journal). An example wherein a conflict is detected among multiple knowledge object customizations and corresponding journal entries is described below in connection with FIG. 5.

In block 420, the search head leader adds the one or more journal entry to a local data store of the search head leader. In an embodiment, the search head leader may mark the added journal entry as "replicated but not applied." In block 430, the search head leader updates a configuration file stored in the local data store of the search head leader with the received journal entry. In an embodiment, in block 440, following the applying of the knowledge object customization corresponding to the received journal entry to its local configuration file, the search head leader may mark the newly added journal entry as "replicated and applied." In an embodiment, the search head leader may send a communication to the follower search head indicating that the follower search head's "push" was applied successfully.

In an embodiment, blocks 420, 430, and 440 may be performed in any order, such that the activity relating to the journal entry (e.g., creating the journal entry, updating the journal entry, etc.) may be performed before, after, or concurrently with the updating of the configuration file. For example, in an embodiment, the search head leader may first update the configuration file with the knowledge object customization. Following or concurrently with the update to the configuration file, the search head may generate the new journal entry including information relating to the knowledge object customization and add the journal entry to a journal stored in a local data store of the search head. In this embodiment, the search head leader records "complete" changes (i.e., changes that have been applied and reflect in the configuration file.

In block 450, the search head leader synchronizes its journal with the other search heads in the cluster. It is noted that the synchronization of the search head leader's journal across the multiple follower search heads of the cluster may be performed at different times or at the same time. In an embodiment, the synchronization in block 450 occurs on an individual basis with respective to the multiple search heads in the cluster. In an embodiment, block 440 occurs for each individual search head upon receipt by the search head leader of a synchronization request for the individual search head. For example, the individual search heads may fetch or "pull" the new changes (e.g., knowledge object customizations) from the search head leader at any time.

Figure 5:
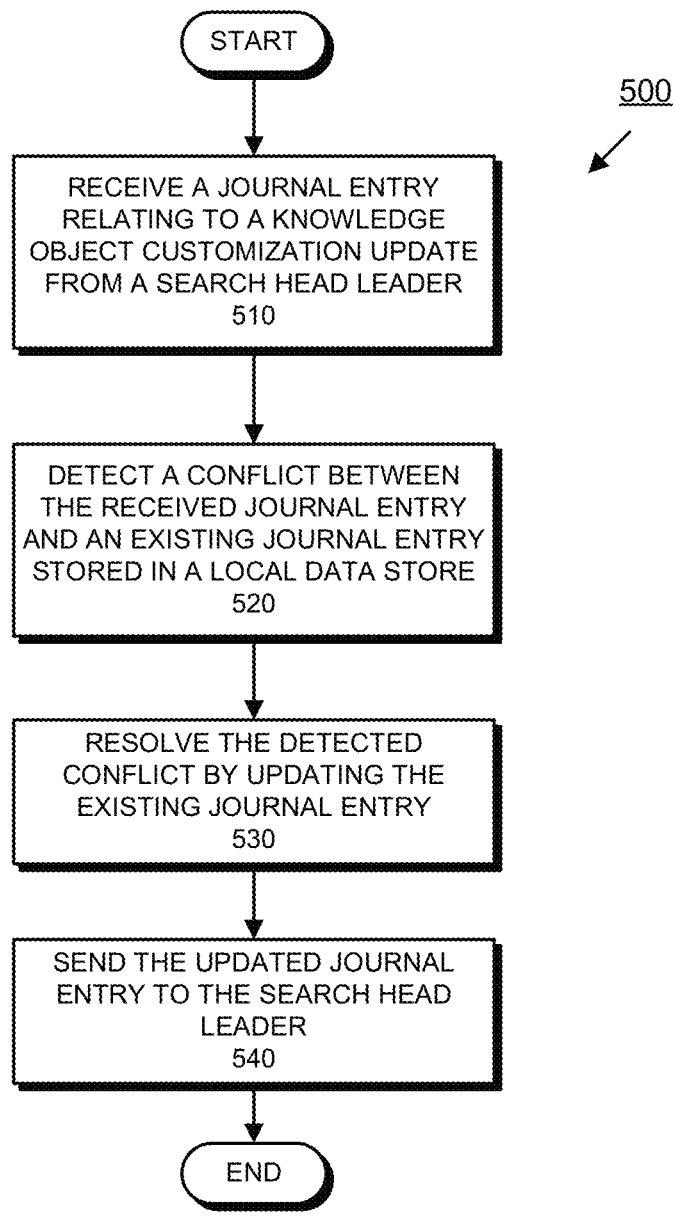
FIG. 5 presents a flowchart illustrating how a search head resolves a conflict associated with a configuration customization, in accordance with one or more aspects of the present disclosure.

FIG. 5 is a flowchart depicting an exemplary method 500 illustrating how a search head resolves a conflict relating to the replication of knowledge object customizations. Continuing the example above, assume a second search head (herein "search head 2") of the cluster synchronizes with the search head leader and receives journal entry J1 from the search head leader. The second search head 2 adds journal entry J1 to its local journal and marks it as "replicated but not applied." Search head 2 then updates its local configuration file by applying journal entry J1. In an embodiment, search head 2 then updates its local journal by marking journal entry J1 as "replicated and applied." At this point in the example, search head 1 and search head 2 each have journal entry J1 in their respective local journals, with the latest commit or update in each local journal being journal entry J1 (relating to G1).

In the example, search head 2 may then generate a new knowledge object customization involving the editing of saved search A. In an embodiment, search head 2 generates a globally unique identifier (herein "G2") identifying the editing of saved search A. Search head 2 then adds a journal entry (herein "J2") including information relating to G2 (e.g., the knowledge object customization identifier (G2), an identification of J1 as a parent commit associated with the current journal entry, information identifying the user that created G2, relevant key-value pairs, etc.) to a journal stored in a local data store of search head 2.

In addition, in this example, search head 2 may generate a new knowledge object customization involving the creation of a new saved search (herein "saved search B"). In an embodiment, search head 2 generates a globally unique identifier (herein "G3") identifying the creation of saved search B. Search head 2 then adds a journal entry (herein "J3") including information relating to G3 (e.g., the knowledge object customization identifier (G3), an identification of J2 as a parent commit associated with the current journal entry, information identifying the user that created G3, relevant key-value pairs, etc.) to a journal stored in a local data store of search head 2.

In this example, search head 1 generates a new knowledge object customization involving the editing of saved search A. In an embodiment, search head 1 generates a globally unique identifier (herein "G4") identifying the editing of saved search A. Search head 1 then adds a journal entry (herein "J4") including information relating to G4 (e.g., the knowledge object customization identifier (G4), an identification of J1 as a parent commit associated with the current journal entry, information identifying the user that created G4, relevant key-value pairs, etc.) to a journal stored in a local data store of search head 1.

In this example, search head 2 synchronizes with the search head leader before search head 1. During the "pull" phase of the synchronization stage, search head 2 determines that it has all of the search head leader's latest commits. During the "push" phase, search head 2 sends journal entries J2 and J3 to the search head leader. The search head leader confirms that J2 and J3 are applied cleanly (i.e., there are no conflicts and the associated knowledge object customizations may be added to the search head leader's configuration files) and adds J2 and J3 to its local journal. The search head leader updates its local configuration files by applying J2 and J3 and notifies search head 2 that the push was successful.

In block 510, a follower search head (e.g., search head 1 in this example) receives one or more journal entries relating to a knowledge object customization update from a search head leader during a "pull" stage of a synchronization phase. The search head determines if it has received and journaled all of the received journal entries provided by the search head leader. For example, when search head 1 engages in the "pull" phase of the synchronization stage, search head 1 determines it does not have all of the search head leader commits (i.e., search head 1 determines it does not have J2 and J3) and fetches or receives J2 and J3 from the search head leader.

With reference to FIG. 5, in block 520, the search head detects a conflict between the received journal entry and an existing journal entry stored in the local journal of the search head's local data store. In an embodiment, the search head may detect a conflict if the received journal entry and the existing journal entry are sibling journal entries (i.e., the two journal entries share the same parent journal entry). In another embodiment, the search head may detect a conflict if the received journal entry and the existing journal entry apply to the same user or entity. If the existing journal entry has already been applied (i.e., added to the configuration file of the search head leader), the search head may proceed to block 530. In this example, search head 1 detects a conflict between the received journal entry (J2) and an existing journal entry (J4) in its local journal because the two journal entries are both related to a configuration action (e.g., an edit) of saved search A.

In block 530, the search head (e.g., search head 1) resolves the detected conflict by updating its existing journal entry to produce an updated journal entry. In an embodiment, the existing journal entry is updated such that it is effectively applied after the received journal entry by changing the existing journal entry's parent commit reference. In an embodiment, the search head adds the received journal entry to its local journal and marks the newly added journal entry as "replicated and applied."

In the example above, search head 1 determines that J2 and J4 are sibling commits (i.e., both journal entries have the same parent commit (J1)). Accordingly, search head 1 determines that J2 has already been effectively applied. In this case, search head 1 seeks to make J4 effectively apply "after" J2. Search head 1 adds J2 to its local journal and marks J2 as "replicated and applied." In addition, search head 1 adds J3 to its local journal and marks J3 as "replicated but not applied." Search head 1 then updates its local configuration files by applying J3 and updates its local journal by marking J3 as "replicated and applied." In block 530, search head 1 resolves the detected conflict by changing J4's parent commit from J1 to J3 in its local journal.

Optionally, as shown in FIG. 5, in block 540, the search head sends the updated journal entry to the search head leader. In an embodiment, the "push" phase of the process wherein the search head sends one or more updated journal entries to the search head leader may be performed following the conflict resolution in block 530, or at any later time during a separate synchronization with the search head. In the example above, search head 1 sends J4 to the search head leader. In an embodiment, the search head leader confirms that J4 applies cleanly. The search head leader adds J4 to its local journal and marks J4 as "replicated but not applied." The search head leader further updates its local configuration files by applying J4 and updates its journal by marking J4 as "replicated and applied." In an embodiment, the search head leader notifies search head 1 that its push was successful. Next, when search head 2 later synchronizes with the search head leader, search head 2 determines it does not have all of the search head leader commits and fetches J4.

In an embodiment, search head 2 confirms that J4 applies cleanly (i.e., that J4's parent commit (J3) is the latest commit in the search head leader's journal). Search head 2 then adds J4 to its local journal and marks J4 as "replicated but not applied." Search head 2 updates its local configuration files by applying J4 and updates its local journal by marking J4 as "replicated and applied."

In this stage in the example, search head 1, search head 2 and the search head leader each have journal entries J1-J4 in their respective local journals, with the latest commit in each search head's journal being J4/G4. In addition, all of the search heads' local configuration files contain the "J4 version" of saved search A and the "J3 version" of saved search B.

The systems and methods described herein above may be employed by various data processing systems, e.g., data aggregation and analysis systems. In certain implementations, the example data aggregation and analysis system may perform search queries on performance data stored as "events," wherein each event comprises a collection of performance data and/or diagnostic information that is generated by a computer system and is correlated with a specific point in time. In various illustrative examples, the data processing system may be represented by the SPLUNK® ENTERPRISE system produced by Splunk Inc. of San Francisco, Calif., to store and process performance data. The data processing system may perform search-related and visualization-related activities using customized knowledge objects discussed above. In certain implementations, the data processing system may be configured to execute certain functions described herein with respect to SPLUNK® APP FOR ENTERPRISE SECURITY.

1.1 Overview

Modern data centers often comprise thousands of host computer systems that operate collectively to service requests from even larger numbers of remote clients. During operation, these data centers generate significant volumes of performance data and diagnostic information that can be analyzed to quickly diagnose performance problems. In order to reduce the size of this performance data, the data is typically pre-processed prior to being stored based on anticipated data-analysis needs. For example, pre-specified data items can be extracted from the performance data and stored in a database to facilitate efficient retrieval and analysis at search time. However, the rest of the performance data is not saved and is essentially discarded during pre-processing. As storage capacity becomes progressively cheaper and more plentiful, there are fewer incentives to discard this performance data and many reasons to keep it.

This plentiful storage capacity is presently making it feasible to store massive quantities of minimally processed performance data at "ingestion time" for later retrieval and analysis at "search time." Note that performing the analysis operations at search time provides greater flexibility because it enables an analyst to search all of the performance data, instead of searching pre-specified data items that were stored at ingestion time. This enables the analyst to investigate different aspects of the performance data instead of being confined to the pre-specified set of data items that were selected at ingestion time.

However, analyzing massive quantities of heterogeneous performance data at search time can be a challenging task. A data center may generate heterogeneous performance data from thousands of different components, which can collectively generate tremendous volumes of performance data that can be time-consuming to analyze. For example, this performance data can include data from system logs, network packet data, sensor data, and data generated by various applications. Also, the unstructured nature of much of this performance data can pose additional challenges because of the difficulty of applying semantic meaning to unstructured data, and the difficulty of indexing and querying unstructured data using traditional database systems.

These challenges can be addressed by using an event-based system, such as the SPLUNK® ENTERPRISE system produced by Splunk Inc. of San Francisco, Calif., to store and process performance data. The SPLUNK® ENTERPRISE system is the leading platform for providing real-time operational intelligence that enables organizations to collect, index, and harness machine-generated data from various websites, applications, servers, networks, and mobile devices that power their businesses. The SPLUNK® ENTERPRISE system is particularly useful for analyzing unstructured performance data, which is commonly found in system log files. Although many of the techniques described herein are explained with reference to the SPLUNK® ENTERPRISE system, the techniques are also applicable to other types of data server systems.

In the SPLUNK® ENTERPRISE system, performance data is stored as "events," wherein each event comprises a collection of performance data and/or diagnostic information that is generated by a computer system and is correlated with a specific point in time. Events can be derived from "time series data," wherein time series data comprises a sequence of data points (e.g., performance measurements from a computer system) that are associated with successive points in time and are typically spaced at uniform time intervals. Events can also be derived from "structured" or "unstructured" data. Structured data has a predefined format, wherein specific data items with specific data formats reside at predefined locations in the data. For example, structured data can include data items stored in fields in a database table. In contrast, unstructured data does not have a predefined format. This means that unstructured data can comprise various data items having different data types that can reside at different locations. For example, when the data source is an operating system log, an event can include one or more lines from the operating system log containing raw data that includes different types of performance and diagnostic information associated with a specific point in time.

Examples of data sources from which an event may be derived include, but are not limited to: web servers; application servers; databases; firewalls; routers; operating systems; and software applications that execute on computer systems, mobile devices, and sensors. The data generated by such data sources can be produced in various forms including, for example and without limitation, server log files, activity log files, configuration files, messages, network packet data, performance measurements and sensor measurements. An event typically includes a timestamp that may be derived from the raw data in the event, or may be determined through interpolation between temporally proximate events having known timestamps.

The SPLUNK® ENTERPRISE system also facilitates using a flexible schema to specify how to extract information from the event data, wherein the flexible schema may be developed and redefined as needed. Note that a flexible schema may be applied to event data "on the fly," when it is needed (e.g., at search time), rather than at ingestion time of the data as in traditional database systems. Because the schema is not applied to event data until it is needed (e.g., at search time), it is referred to as a "late-binding schema."

During operation, the SPLUNK® ENTERPRISE system starts with raw data, which can include unstructured data, machine data, performance measurements or other time-series data, such as data obtained from weblogs, syslogs, or sensor readings. It divides this raw data into "portions," and optionally transforms the data to produce timestamped events. The system stores the timestamped events in a data store, and enables a user to run queries against the data store to retrieve events that meet specified criteria, such as containing certain keywords or having specific values in defined fields. Note that the term "field" refers to a location in the event data containing a value for a specific data item.

As noted above, the SPLUNK® ENTERPRISE system facilitates using a late-binding schema while performing queries on events. A late-binding schema specifies "extraction rules" that are applied to data in the events to extract values for specific fields. More specifically, the extraction rules for a field can include one or more instructions that specify how to extract a value for the field from the event data. An extraction rule can generally include any type of instruction for extracting values from data in events. In some cases, an extraction rule comprises a regular expression, in which case the rule is referred to as a "regex rule."

In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself, or may be located during execution of the query. Hence, as an analyst learns more about the data in the events, the analyst can continue to refine the late-binding schema by adding new fields, deleting fields, or changing the field extraction rules until the next time the schema is used by a query. Because the SPLUNK® ENTERPRISE system maintains the underlying raw data and provides a late-binding schema for searching the raw data, it enables an analyst to investigate questions that arise as the analyst learns more about the events.

In the SPLUNK® ENTERPRISE system, a field extractor may be configured to automatically generate extraction rules for certain fields in the events when the events are being created, indexed, or stored, or possibly at a later time. Alternatively, a user may manually define extraction rules for fields using a variety of techniques.

Also, a number of "default fields" that specify metadata about the events rather than data in the events themselves can be created automatically. For example, such default fields can specify: a timestamp for the event data; a host from which the event data originated; a source of the event data; and a source type for the event data. These default fields may be determined automatically when the events are created, indexed or stored.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by different data sources, the system facilitates use of a "common information model" (CIM) across the different data sources.

1.2 Data Server System

Figure 6:
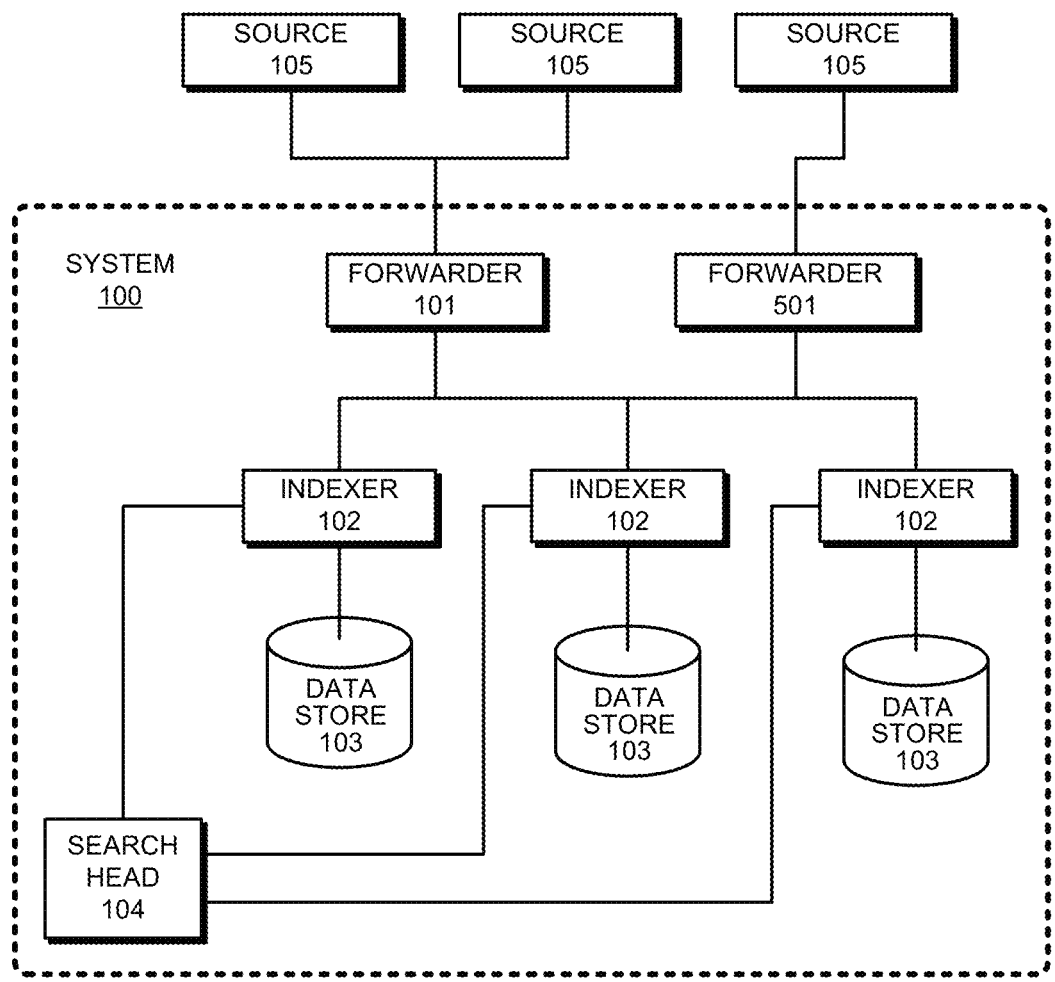
FIG. 6 presents a block diagram of an event-processing system in accordance with the disclosed embodiments.

FIG. 6 presents a block diagram of an exemplary event-processing system 100, similar to the SPLUNK® ENTERPRISE system. System 100 includes one or more forwarders 101 that collect data obtained from a variety of different data sources 105, and one or more indexers 102 that store, process, and/or perform operations on this data, wherein each indexer operates on data contained in a specific data store 103. These forwarders and indexers can comprise separate computer systems in a data center, or may alternatively comprise separate processes executing on various computer systems in a data center.

During operation, the forwarders 101 identify which indexers 102 will receive the collected data and then forward the data to the identified indexers. Forwarders 101 can also perform operations to strip out extraneous data and detect timestamps in the data. The forwarders next determine which indexers 102 will receive each data item and then forward the data items to the determined indexers 102.

Note that distributing data across different indexers facilitates parallel processing. This parallel processing can take place at data ingestion time, because multiple indexers can process the incoming data in parallel. The parallel processing can also take place at search time, because multiple indexers can search through the data in parallel.

System 100 and the processes described below with respect to FIGS. 1-5 are further described in "Exploring Splunk Search Processing Language (SPL) Primer and Cookbook" by David Carasso, CITO Research, 2012, and in "Optimizing Data Analysis With a Semi-Structured Time Series Database" by Ledion Bitincka, Archana Ganapathi, Stephen Sorkin, and Steve Zhang, SLAML, 2010, each of which is hereby incorporated herein by reference in its entirety for all purposes.

1.3 Data Ingestion

Figure 7:
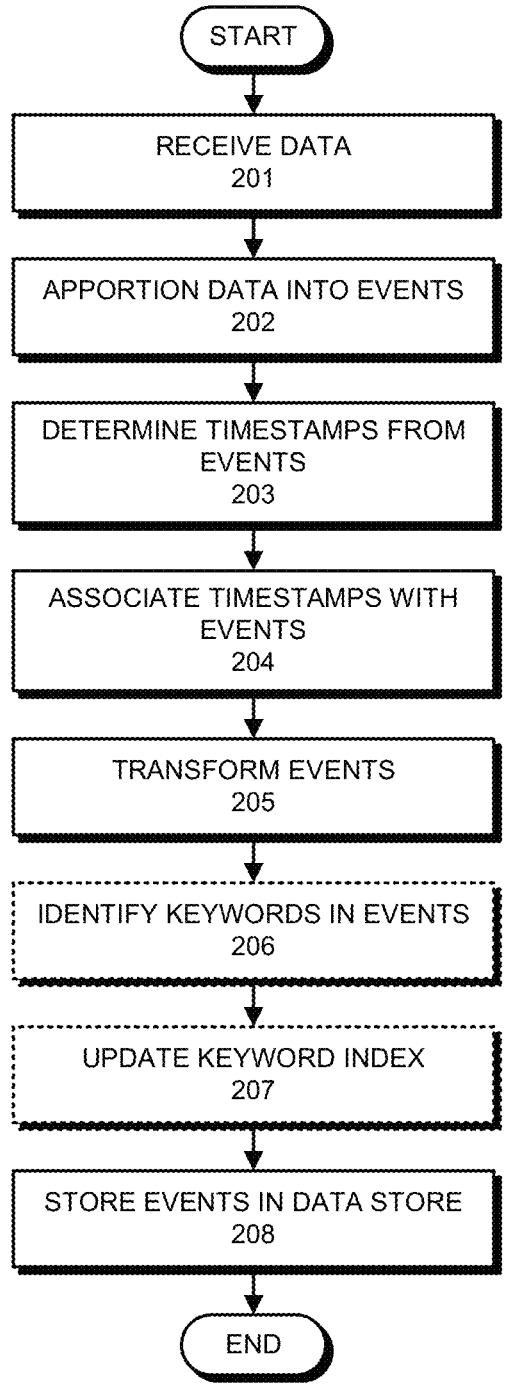
FIG. 7 presents a flowchart illustrating how indexers process, index, and store data received from forwarders in accordance with the disclosed embodiments.

FIG. 7 presents a flowchart illustrating how an indexer processes, indexes, and stores data received from forwarders in accordance with the disclosed embodiments. At block 201, the indexer receives the data from the forwarder. Next, at block 202, the indexer apportions the data into events. Note that the data can include lines of text that are separated by carriage returns or line breaks and an event may include one or more of these lines. During the apportioning process, the indexer can use heuristic rules to automatically determine the boundaries of the events, which for example coincide with line boundaries. These heuristic rules may be determined based on the source of the data, wherein the indexer can be explicitly informed about the source of the data or can infer the source of the data by examining the data. These heuristic rules can include regular expression-based rules or delimiter-based rules for determining event boundaries, wherein the event boundaries may be indicated by predefined characters or character strings. These predefined characters may include punctuation marks or other special characters including, for example, carriage returns, tabs, spaces or line breaks. In some cases, a user can fine-tune or configure the rules that the indexers use to determine event boundaries in order to adapt the rules to the user's specific requirements.

Next, the indexer determines a timestamp for each event at block 203. As mentioned above, these timestamps can be determined by extracting the time directly from data in the event, or by interpolating the time based on timestamps from temporally proximate events. In some cases, a timestamp can be determined based on the time the data was received or generated. The indexer subsequently associates the determined timestamp with each event at block 204, for example by storing the timestamp as metadata for each event.

Then, the system can apply transformations to data to be included in events at block 205. For log data, such transformations can include removing a portion of an event (e.g., a portion used to define event boundaries, extraneous text, characters, etc.) or removing redundant portions of an event. Note that a user can specify portions to be removed using a regular expression or any other possible technique.

Next, a keyword index can optionally be generated to facilitate fast keyword searching for events. To build a keyword index, the indexer first identifies a set of keywords in block 206. Then, at block 207 the indexer includes the identified keywords in an index, which associates each stored keyword with references to events containing that keyword (or to locations within events where that keyword is located). When an indexer subsequently receives a keyword-based query, the indexer can access the keyword index to quickly identify events containing the keyword.

In some embodiments, the keyword index may include entries for name-value pairs found in events, wherein a name-value pair can include a pair of keywords connected by a symbol, such as an equals sign or colon. In this way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event, and assigned a value of "10.0.1.2."

Finally, the indexer stores the events in a data store at block 208, wherein a timestamp can be stored with each event to facilitate searching for events based on a time range. In some cases, the stored events are organized into a plurality of buckets, wherein each bucket stores events associated with a specific time range. This not only improves time-based searches, but it also allows events with recent timestamps that may have a higher likelihood of being accessed to be stored in faster memory to facilitate faster retrieval. For example, a bucket containing the most recent events can be stored as flash memory instead of on hard disk.

Each indexer 102 is responsible for storing and searching a subset of the events contained in a corresponding data store 103. By distributing events among the indexers and data stores, the indexers can analyze events for a query in parallel, for example using map-reduce techniques, wherein each indexer returns partial responses for a subset of events to a search head that combines the results to produce an answer for the query. By storing events in buckets for specific time ranges, an indexer may further optimize searching by looking only in buckets for time ranges that are relevant to a query.

Moreover, events and buckets can also be replicated across different indexers and data stores to facilitate high availability and disaster recovery as is described in U.S. patent application Ser. No. 14/266,812 filed on 30 Apr. 2014, and in U.S. application patent Ser. No. 14/266,817 also filed on 30 Apr. 2014.

1.4 Query Processing

Figure 8:
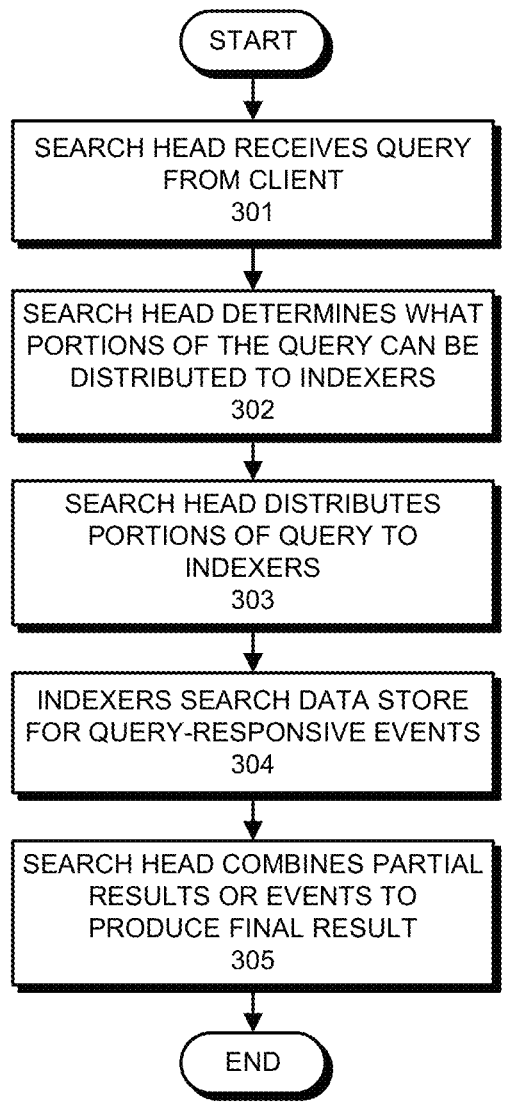
FIG. 8 presents a flowchart illustrating how a search head and indexers perform a search query in accordance with one or more aspects of the present disclosure.

FIG. 8 presents a flowchart illustrating how a search head and indexers perform a search query in accordance with the disclosed embodiments. At the start of this process, a search head receives a search query from a client at block 301. Next, at block 302, the search head analyzes the search query to determine what portions can be delegated to indexers and what portions need to be executed locally by the search head. At block 303, the search head distributes the determined portions of the query to the indexers. Note that commands that operate on single events can be trivially delegated to the indexers, while commands that involve events from multiple indexers are harder to delegate.

Then, at block 304, the indexers to which the query was distributed search their data stores for events that are responsive to the query. To determine which events are responsive to the query, the indexer searches for events that match the criteria specified in the query. This criteria can include matching keywords or specific values for certain fields. In a query that uses a late-binding schema, the searching operations in block 304 may involve using the late-binding scheme to extract values for specified fields from events at the time the query is processed. Next, the indexers can either send the relevant events back to the search head, or use the events to calculate a partial result, and send the partial result back to the search head.

Finally, at block 305, the search head combines the partial results and/or events received from the indexers to produce a final result for the query. This final result can comprise different types of data depending upon what the query is asking for. For example, the final results can include a listing of matching events returned by the query, or some type of visualization of data from the returned events. In another example, the final result can include one or more calculated values derived from the matching events.

Moreover, the results generated by system 100 can be returned to a client using different techniques. For example, one technique streams results back to a client in real-time as they are identified. Another technique waits to report results to the client until a complete set of results is ready to return to the client. Yet another technique streams interim results back to the client in real-time until a complete set of results is ready, and then returns the complete set of results to the client. In another technique, certain results are stored as "search jobs," and the client may subsequently retrieve the results by referencing the search jobs.

The search head can also perform various operations to make the search more efficient. For example, before the search head starts executing a query, the search head can determine a time range for the query and a set of common keywords that all matching events must include. Next, the search head can use these parameters to query the indexers to obtain a superset of the eventual results. Then, during a filtering stage, the search head can perform field-extraction operations on the superset to produce a reduced set of search results.

1.5 Field Extraction

Figure 9:
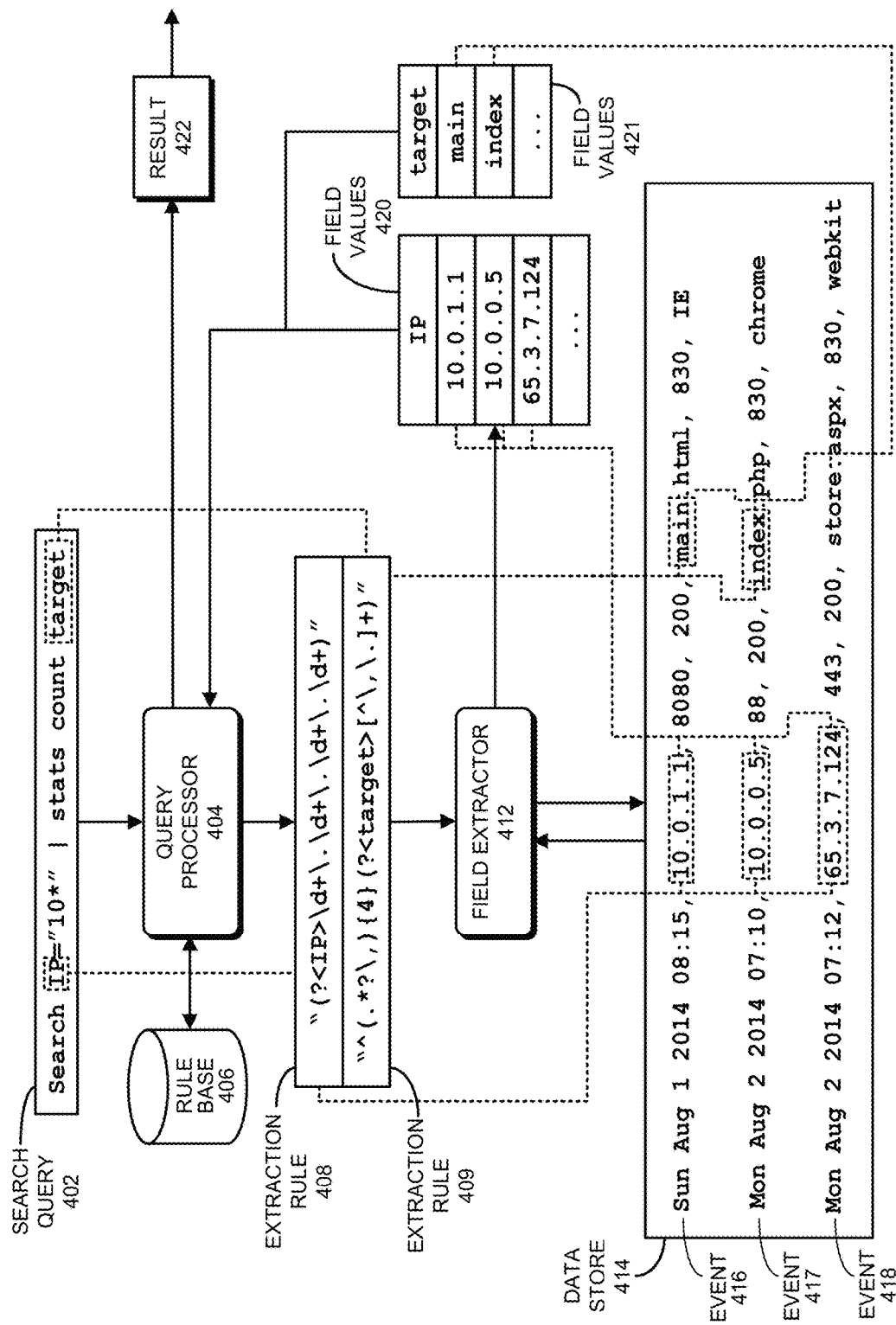
FIG. 9 presents a block diagram of a system for processing search requests that uses extraction rules for field values in accordance with one or more aspects of the present disclosure.

FIG. 9 presents a block diagram illustrating how fields can be extracted during query processing in accordance with the disclosed embodiments. At the start of this process, a search query 402 is received at a query processor 404. Query processor 404 includes various mechanisms for processing a query, wherein these mechanisms can reside in a search head 104 and/or an indexer 102. Note that the exemplary search query 402 illustrated in FIG. 4 is expressed in Search Processing Language (SPL), which is used in conjunction with the SPLUNK® ENTERPRISE system. SPL is a pipelined search language in which a set of inputs is operated on by a first command in a command line, and then a subsequent command following the pipe symbol "|" operates on the results produced by the first command, and so on for additional commands. Search query 402 can also be expressed in other query languages, such as the Structured Query Language ("SQL") or any suitable query language.

Upon receiving search query 402, query processor 404 sees that search query 402 includes two fields "IP" and "target." Query processor 404 also determines that the values for the "IP" and "target" fields have not already been extracted from events in data store 414, and consequently determines that query processor 404 needs to use extraction rules to extract values for the fields. Hence, query processor 404 performs a lookup for the extraction rules in a rule base 406, wherein rule base 406 maps field names to corresponding extraction rules and obtains extraction rules 408-409, wherein extraction rule 408 specifies how to extract a value for the "IP" field from an event, and extraction rule 409 specifies how to extract a value for the "target" field from an event. As is illustrated in FIG. 9, extraction rules 408-409 can comprise regular expressions that specify how to extract values for the relevant fields. Such regular-expression-based extraction rules are also referred to as "regex rules." In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

Next, query processor 404 sends extraction rules 408-409 to a field extractor 412, which applies extraction rules 408-409 to events 416-418 in a data store 414. Note that data store 414 can include one or more data stores, and extraction rules 408-409 can be applied to large numbers of events in data store 414, and are not meant to be limited to the three events 416-418 illustrated in FIG. 9. Moreover, the query processor 404 can instruct field extractor 412 to apply the extraction rules to all the events in a data store 414, or to a subset of the events that have been filtered based on some criteria.

Next, field extractor 412 applies extraction rule 408 for the first command "Search IP="10*"" to events in data store 414 including events 416-418. Extraction rule 408 is used to extract values for the IP address field from events in data store 414 by looking for a pattern of one or more digits, followed by a period, followed again by one or more digits, followed by another period, followed again by one or more digits, followed by another period, and followed again by one or more digits. Next, field extractor 412 returns field values 420 to query processor 404, which uses the criterion IP="10*" to look for IP addresses that start with "10". Note that events 416 and 417 match this criterion, but event 418 does not, so the result set for the first command is events 416-417.

Query processor 404 then sends events 416-417 to the next command "stats count target." To process this command, query processor 404 causes field extractor 412 to apply extraction rule 409 to events 416-417. Extraction rule 409 is used to extract values for the target field for events 416-417 by skipping the first four commas in events 416-417, and then extracting all of the following characters until a comma or period is reached. Next, field extractor 412 returns field values 421 to query processor 404, which executes the command "stats count target" to count the number of unique values contained in the target fields, which in this example produces the value "2" that is returned as a final result 422 for the query.

Note that query results can be returned to a client, a search head, or any other system component for further processing. In general, query results may include: a set of one or more events; a set of one or more values obtained from the events; a subset of the values; statistics calculated based on the values; a report containing the values; or a visualization, such as a graph or chart, generated from the values.

1.6 Exemplary Search Screen

Figure 11A:
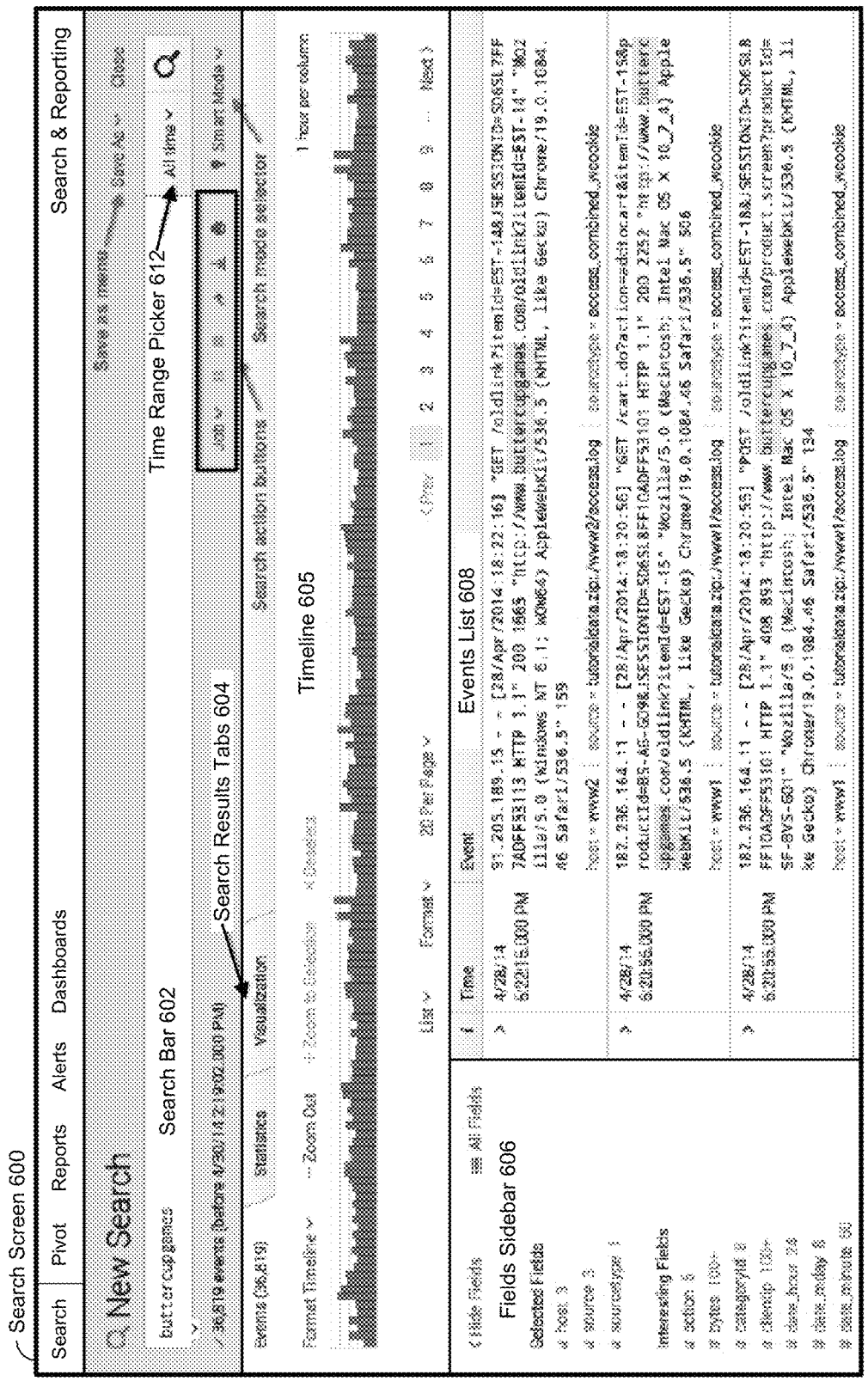
FIG. 11A illustrates a search screen in accordance with one or more aspects of the present disclosure.
Figure 11B:
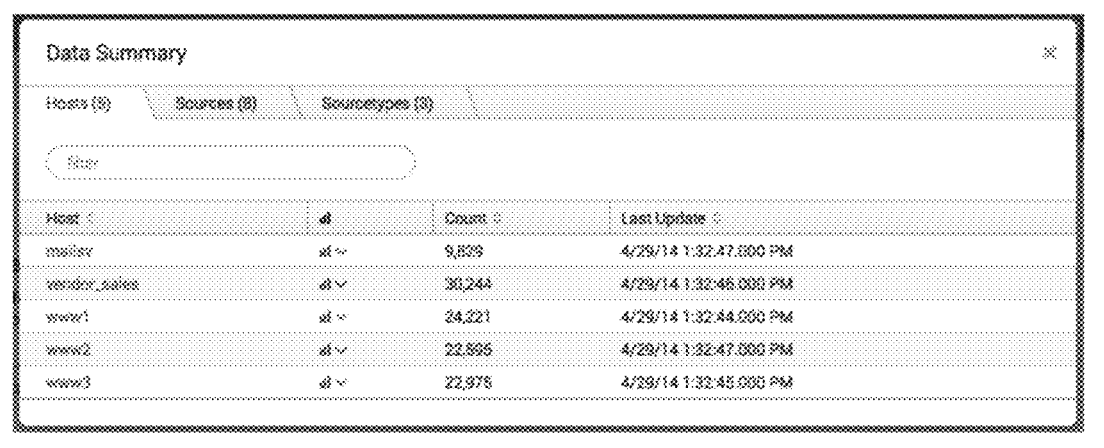

FIG. 11A illustrates an exemplary search screen 600 in accordance with the disclosed embodiments. Search screen 600 includes a search bar 602 that accepts user input in the form of a search string. It also includes a time range picker 612 that enables the user to specify a time range for the search. For "historical searches" the user can select a specific time range, or alternatively a relative time range, such as "today," "yesterday" or "last week." For "real-time searches," the user can select the size of a preceding time window to search for real-time events. Search screen 600 also initially displays a "data summary" dialog as is illustrated in FIG. 11B that enables the user to select different sources for the event data, for example by selecting specific hosts and log files.

After the search is executed, the search screen 600 can display the results through search results tabs 604, wherein search results tabs 604 includes: an "events tab" that displays various information about events returned by the search; a "statistics tab" that displays statistics about the search results; and a "visualization tab" that displays various visualizations of the search results. The events tab illustrated in FIG. 11A displays a timeline graph 605 that graphically illustrates the number of events that occurred in one-hour intervals over the selected time range. It also displays an events list 608 that enables a user to view the raw data in each of the returned events. It additionally displays a fields sidebar 606 that includes statistics about occurrences of specific fields in the returned events, including "selected fields" that are pre-selected by the user, and "interesting fields" that are automatically selected by the system based on pre-specified criteria.

1.7 Acceleration Techniques

The above-described system provides significant flexibility by enabling a user to analyze massive quantities of minimally processed performance data "on the fly" at search time instead of storing pre-specified portions of the performance data in a database at ingestion time. This flexibility enables a user to see correlations in the performance data and perform subsequent queries to examine interesting aspects of the performance data that may not have been apparent at ingestion time.

However, performing extraction and analysis operations at search time can involve a large amount of data and require a large number of computational operations, which can cause considerable delays while processing the queries. Fortunately, a number of acceleration techniques have been developed to speed up analysis operations performed at search time. These techniques include: (1) performing search operations in parallel by formulating a search as a map-reduce computation; (2) using a keyword index; (3) using a high performance analytics store; and (4) accelerating the process of generating reports. These techniques are described in more detail below.

1.7.1 Map-Reduce Technique

To facilitate faster query processing, a query can be structured as a map-reduce computation, wherein the "map" operations are delegated to the indexers, while the corresponding "reduce" operations are performed locally at the search head. For example, FIG. 10 illustrates how a search query 501 received from a client at search head 104 can split into two phases, including: (1) a "map phase" comprising subtasks 502 (e.g., data retrieval or simple filtering) that may be performed in parallel and are "mapped" to indexers 102 for execution, and (2) a "reduce phase" comprising a merging operation 503 to be executed by the search head when the results are ultimately collected from the indexers.

During operation, upon receiving search query 501, search head 104 modifies search query 501 by substituting "stats" with "prestats" to produce search query 502, and then distributes search query 502 to one or more distributed indexers, which are also referred to as "search peers." Note that search queries may generally specify search criteria or operations to be performed on events that meet the search criteria. Search queries may also specify field names, as well as search criteria for the values in the fields or operations to be performed on the values in the fields. Moreover, the search head may distribute the full search query to the search peers as is illustrated in FIG. 8, or may alternatively distribute a modified version (e.g., a more restricted version) of the search query to the search peers. In this example, the indexers are responsible for producing the results and sending them to the search head. After the indexers return the results to the search head, the search head performs the merging operations 503 on the results. Note that by executing the computation in this way, the system effectively distributes the computational operations while minimizing data transfers.

1.7.2 Keyword Index

As described above with reference to the flow charts in FIGS. 7 and 8, event-processing system 100 can construct and maintain one or more keyword indices to facilitate rapidly identifying events containing specific keywords. This can greatly speed up the processing of queries involving specific keywords. As mentioned above, to build a keyword index, an indexer first identifies a set of keywords. Then, the indexer includes the identified keywords in an index, which associates each stored keyword with references to events containing that keyword, or to locations within events where that keyword is located. When an indexer subsequently receives a keyword-based query, the indexer can access the keyword index to quickly identify events containing the keyword.

1.7.3 High Performance Analytics Store

To speed up certain types of queries, some embodiments of system 100 make use of a high performance analytics store, which is referred to as a "summarization table," that contains entries for specific field-value pairs. Each of these entries keeps track of instances of a specific value in a specific field in the event data and includes references to events containing the specific value in the specific field. For example, an exemplary entry in a summarization table can keep track of occurrences of the value "94107" in a "ZIP code" field of a set of events, wherein the entry includes references to all of the events that contain the value "94107" in the ZIP code field. This enables the system to quickly process queries that seek to determine how many events have a particular value for a particular field, because the system can examine the entry in the summarization table to count instances of the specific value in the field without having to go through the individual events or do extractions at search time. Also, if the system needs to process all events that have a specific field-value combination, the system can use the references in the summarization table entry to directly access the events to extract further information without having to search all of the events to find the specific field-value combination at search time.

In some embodiments, the system maintains a separate summarization table for each of the above-described time-specific buckets that stores events for a specific time range, wherein a bucket-specific summarization table includes entries for specific field-value combinations that occur in events in the specific bucket. Alternatively, the system can maintain a separate summarization table for each indexer, wherein the indexer-specific summarization table only includes entries for the events in a data store that is managed by the specific indexer.

The summarization table can be populated by running a "collection query" that scans a set of events to find instances of a specific field-value combination, or alternatively instances of all field-value combinations for a specific field. A collection query can be initiated by a user, or can be scheduled to occur automatically at specific time intervals. A collection query can also be automatically launched in response to a query that asks for a specific field-value combination.

In some cases, the summarization tables may not cover all of the events that are relevant to a query. In this case, the system can use the summarization tables to obtain partial results for the events that are covered by summarization tables, but may also have to search through other events that are not covered by the summarization tables to produce additional results. These additional results can then be combined with the partial results to produce a final set of results for the query. This summarization table and associated techniques are described in more detail in U.S. Pat. No. 8,682,925, issued on Mar. 25, 2014.

1.7.4 Accelerating Report Generation

In some embodiments, a data server system such as the SPLUNK® ENTERPRISE system can accelerate the process of periodically generating updated reports based on query results. To accelerate this process, a summarization engine automatically examines the query to determine whether generation of updated reports can be accelerated by creating intermediate summaries. (This is possible if results from preceding time periods can be computed separately and combined to generate an updated report. In some cases, it is not possible to combine such incremental results, for example where a value in the report depends on relationships between events from different time periods.) If reports can be accelerated, the summarization engine periodically generates a summary covering data obtained during a latest non-overlapping time period. For example, where the query seeks events meeting a specified criteria, a summary for the time period includes only events within the time period that meet the specified criteria. Similarly, if the query seeks statistics calculated from the events, such as the number of events that match the specified criteria, then the summary for the time period includes the number of events in the period that match the specified criteria.

In parallel with the creation of the summaries, the summarization engine schedules the periodic updating of the report associated with the query. During each scheduled report update, the query engine determines whether intermediate summaries have been generated covering portions of the time period covered by the report update. If so, then the report is generated based on the information contained in the summaries. Also, if additional event data has been received and has not yet been summarized, and is required to generate the complete report, the query can be run on this additional event data. Then, the results returned by this query on the additional event data, along with the partial results obtained from the intermediate summaries, can be combined to generate the updated report. This process is repeated each time the report is updated. Alternatively, if the system stores events in buckets covering specific time ranges, then the summaries can be generated on a bucket-by-bucket basis. Note that producing intermediate summaries can save the work involved in re-running the query for previous time periods, so only the newer event data needs to be processed while generating an updated report. These report acceleration techniques are described in more detail in U.S. Pat. No. 8,589,403, issued on Nov. 19, 2013, and U.S. Pat. No. 8,412,696, issued on Apr. 2, 2011.

1.8. Security Features

The SPLUNK® ENTERPRISE platform provides various schemas, dashboards and visualizations that make it easy for developers to create applications to provide additional capabilities. One such application is the SPLUNK® APP FOR ENTERPRISE SECURITY, which performs monitoring and alerting operations and includes analytics to facilitate identifying both known and unknown security threats based on large volumes of data stored by the SPLUNK® ENTERPRISE system. This differs significantly from conventional Security Information and Event Management (SIEM) systems that lack the infrastructure to effectively store and analyze large volumes of security-related event data. Traditional SIEM systems typically use fixed schemas to extract data from pre-defined security-related fields at data ingestion time, wherein the extracted data is typically stored in a relational database. This data extraction process (and associated reduction in data size) that occurs at data ingestion time inevitably hampers future incident investigations, when all of the original data may be needed to determine the root cause of a security issue, or to detect the tiny fingerprints of an impending security threat.

In contrast, the SPLUNK® APP FOR ENTERPRISE SECURITY system stores large volumes of minimally processed security-related data at ingestion time for later retrieval and analysis at search time when a live security threat is being investigated. To facilitate this data retrieval process, the SPLUNK® APP FOR ENTERPRISE SECURITY provides pre-specified schemas for extracting relevant values from the different types of security-related event data, and also enables a user to define such schemas.

The SPLUNK® APP FOR ENTERPRISE SECURITY can process many types of security-related information. In general, this security-related information can include any information that can be used to identify security threats. For example, the security-related information can include network-related information, such as IP addresses, domain names, asset identifiers, network traffic volume, uniform resource locator strings, and source addresses. (The process of detecting security threats for network-related information is further described in U.S. patent application Ser. Nos. 13/956,252, and 13/956,262.) Security-related information can also include endpoint information, such as malware infection data and system configuration information, as well as access control information, such as login/logout information and access failure notifications. The security-related information can originate from various sources within a data center, such as hosts, virtual machines, storage devices and sensors. The security-related information can also originate from various sources in a network, such as routers, switches, email servers, proxy servers, gateways, firewalls and intrusion-detection systems.

During operation, the SPLUNK® APP FOR ENTERPRISE SECURITY facilitates detecting so-called "notable events" that are likely to indicate a security threat. These notable events can be detected in a number of ways: (1) an analyst can notice a correlation in the data and can manually identify a corresponding group of one or more events as "notable;" or (2) an analyst can define a "correlation search" specifying criteria for a notable event, and every time one or more events satisfy the criteria, the application can indicate that the one or more events are notable. An analyst can alternatively select a pre-defined correlation search provided by the application. Note that correlation searches can be run continuously or at regular intervals (e.g., every hour) to search for notable events. Upon detection, notable events can be stored in a dedicated "notable events index," which can be subsequently accessed to generate various visualizations containing security-related information. Also, alerts can be generated to notify system operators when important notable events are discovered.

Figure 12A:
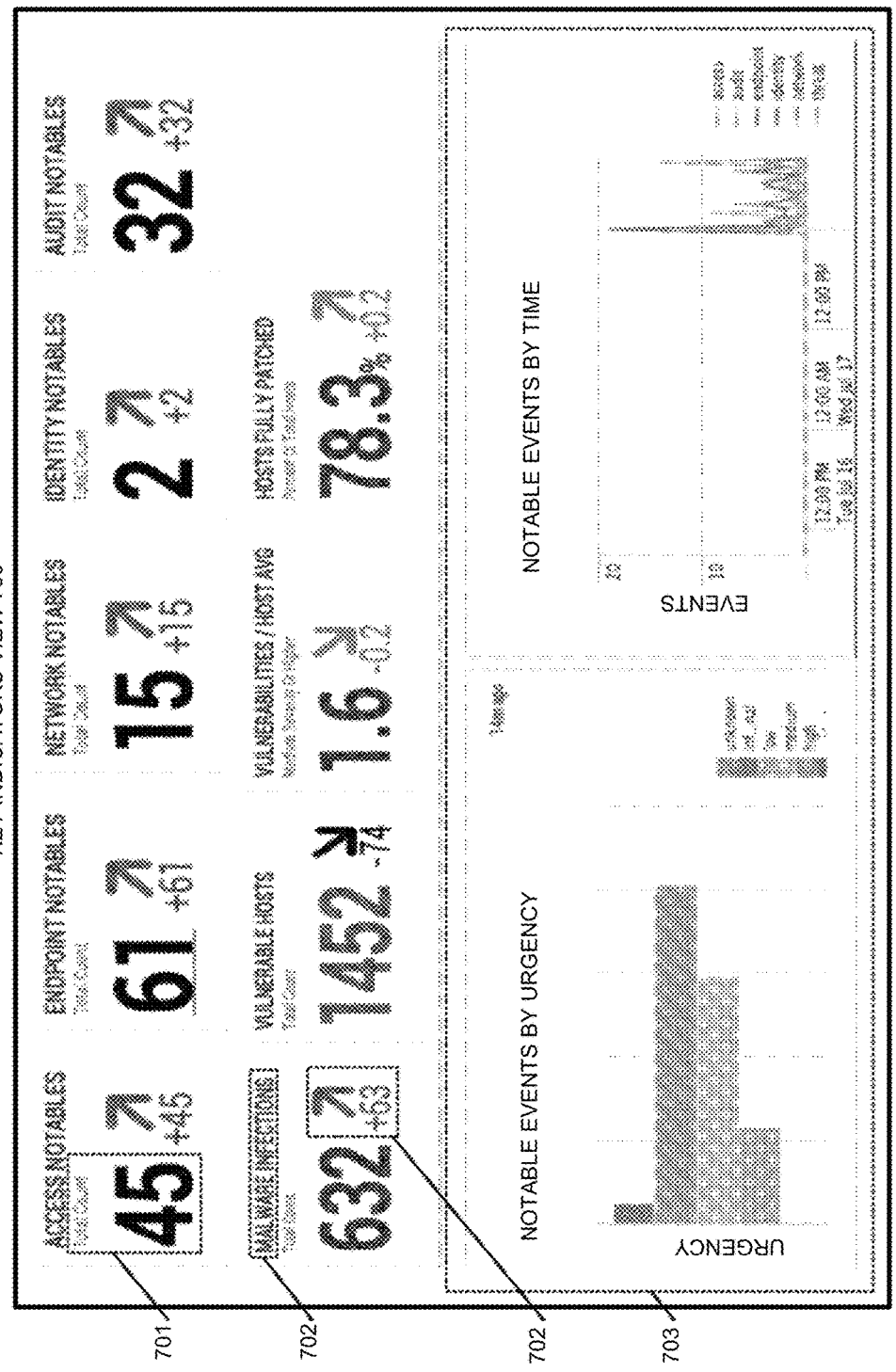
FIG. 12A illustrates a key indicators view in accordance with one or more aspects of the present disclosure.

The SPLUNK® APP FOR ENTERPRISE SECURITY provides various visualizations to aid in discovering security threats, such as a "key indicators view" that enables a user to view security metrics of interest, such as counts of different types of notable events. For example, FIG. 12A illustrates an exemplary key indicators view 700 that comprises a dashboard, which can display a value 701, for various security-related metrics, such as malware infections 702. It can also display a change in a metric value 703, which indicates that the number of malware infections increased by 63 during the preceding interval. Key indicators view 700 additionally displays a histogram panel 704 that displays a histogram of notable events organized by urgency values, and a histogram of notable events organized by time intervals. This key indicators view is described in further detail in pending U.S. patent application Ser. No. 13/956,338 filed Jul. 31, 2013.

Figure 12B:
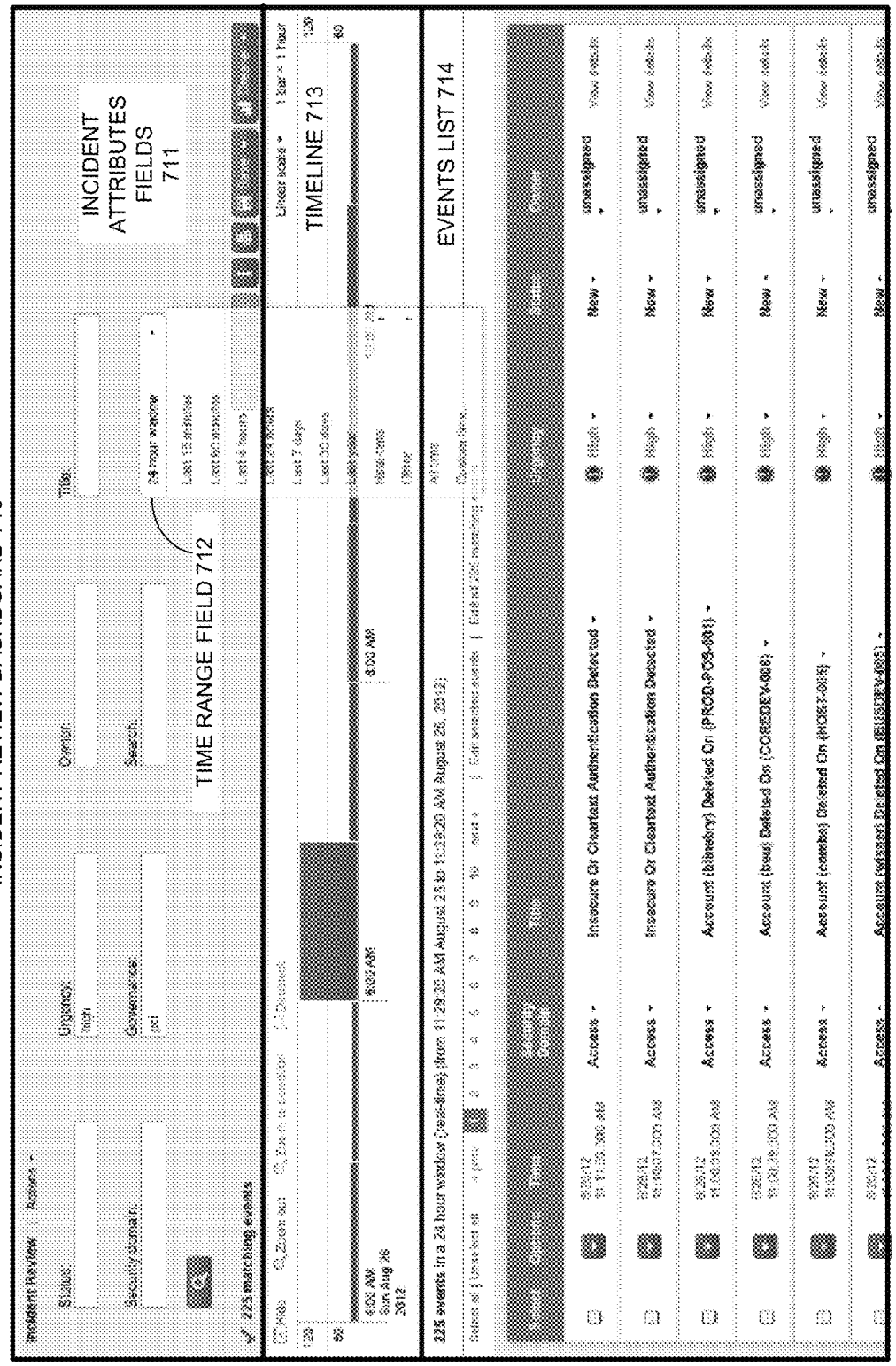
FIG. 12B illustrates an incident review dashboard in accordance with one or more aspects of the present disclosure.

These visualizations can also include an "incident review dashboard" that enables a user to view and act on "notable events." These notable events can include: (1) a single event of high importance, such as any activity from a known web attacker; or (2) multiple events that collectively warrant review, such as a large number of authentication failures on a host followed by a successful authentication. For example, FIG. 12B illustrates an exemplary incident review dashboard 710 that includes a set of incident attribute fields 711 that, for example, enables a user to specify a time range field 712 for the displayed events. It also includes a timeline 713 that graphically illustrates the number of incidents that occurred in one-hour time intervals over the selected time range. It additionally displays an events list 714 that enables a user to view a list of all of the notable events that match the criteria in the incident attributes fields 711. To facilitate identifying patterns among the notable events, each notable event can be associated with an urgency value (e.g., low, medium, high, critical), which is indicated in the incident review dashboard. The urgency value for a detected event can be determined based on the severity of the event and the priority of the system component associated with the event. The incident review dashboard is described further in "http://docs.splunk.com/Documentation/PCI/2.1.1/User/IncidentReviewdashboard."

1.9 Data Center Monitoring

As mentioned above, the SPLUNK® ENTERPRISE platform provides various features that make it easy for developers to create various applications. One such application is the SPLUNK® APP FOR VMWARE®, which performs monitoring operations and includes analytics to facilitate diagnosing the root cause of performance problems in a data center based on large volumes of data stored by the SPLUNK® ENTERPRISE system.

This differs from conventional data-center-monitoring systems that lack the infrastructure to effectively store and analyze large volumes of performance information and log data obtained from the data center. In conventional data-center-monitoring systems, this performance data is typically pre-processed prior to being stored, for example by extracting pre-specified data items from the performance data and storing them in a database to facilitate subsequent retrieval and analysis at search time. However, the rest of the performance data is not saved and is essentially discarded during pre-processing. In contrast, the SPLUNK® APP FOR VMWARE® stores large volumes of minimally processed performance information and log data at ingestion time for later retrieval and analysis at search time when a live performance issue is being investigated.

The SPLUNK® APP FOR VMWARE® can process many types of performance-related information. In general, this performance-related information can include any type of performance-related data and log data produced by virtual machines and host computer systems in a data center. In addition to data obtained from various log files, this performance-related information can include values for performance metrics obtained through an application programming interface (API) provided as part of the vSphere Hypervisor™ system distributed by VMware, Inc. of Palo Alto, Calif. For example, these performance metrics can include: (1) CPU-related performance metrics; (2) disk-related performance metrics; (3) memory-related performance metrics; (4) network-related performance metrics; (5) energy-usage statistics; (6) data-traffic-related performance metrics; (7) overall system availability performance metrics; (8) cluster-related performance metrics; and (9) virtual machine performance statistics. For more details about such performance metrics, please see U.S. patent Ser. No. 14/167,316 filed 29 Jan. 2014, which is hereby incorporated herein by reference. Also, see "vSphere Monitoring and Performance," Update 1, vSphere 5.5, EN-001357-00, http://pubs.vmware.com/vsphere-55/topic/com.vmware.ICbase/PDF/vsphere-esxi-vcenter-server-551-monitoring-performance-guide.pdf.

To facilitate retrieving information of interest from performance data and log files, the SPLUNK® APP FOR VMWARE® provides pre-specified schemas for extracting relevant values from different types of performance-related event data, and also enables a user to define such schemas.

Figure 12C:
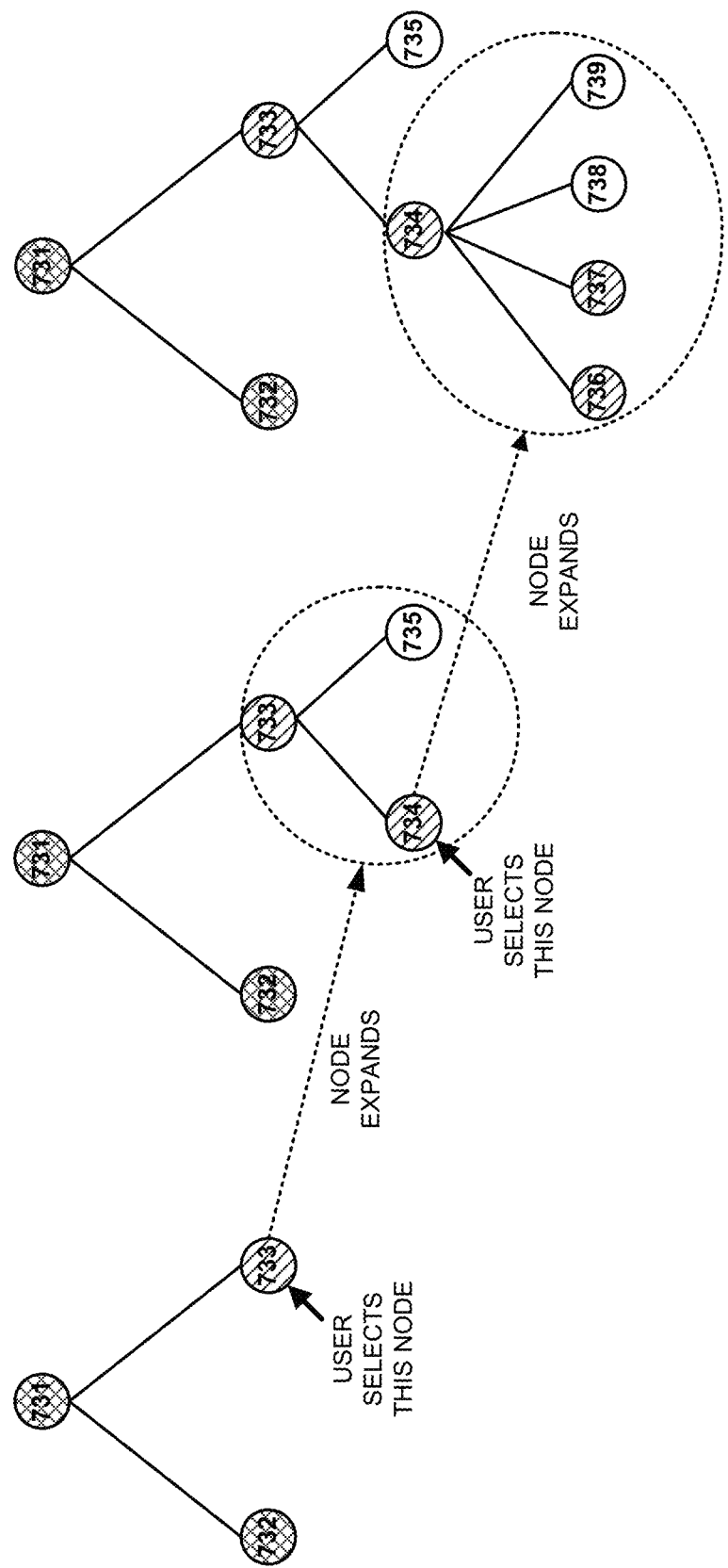
FIG. 12C illustrates a proactive monitoring tree in accordance with one or more aspects of the present disclosure.

The SPLUNK® APP FOR VMWARE® additionally provides various visualizations to facilitate detecting and diagnosing the root cause of performance problems. For example, one such visualization is a "proactive monitoring tree" that enables a user to easily view and understand relationships among various factors that affect the performance of a hierarchically structured computing system. This proactive monitoring tree enables a user to easily navigate the hierarchy by selectively expanding nodes representing various entities (e.g., virtual centers or computing clusters) to view performance information for lower-level nodes associated with lower-level entities (e.g., virtual machines or host systems). Exemplary node-expansion operations are illustrated in FIG. 12C, wherein nodes 733 and 734 are selectively expanded. Note that nodes 731-739 can be displayed using different patterns or colors to represent different performance states, such as a critical state, a warning state, a normal state, an unknown/offline state. The ease of navigation provided by selective expansion in combination with the associated performance-state information enables a user to quickly diagnose the root cause of a performance problem. The proactive monitoring tree is described in further detail in U.S. patent application Ser. No. 14/235,490 filed on 15 Apr. 2014, which is hereby incorporated herein by reference for all possible purposes.

Figure 12D:
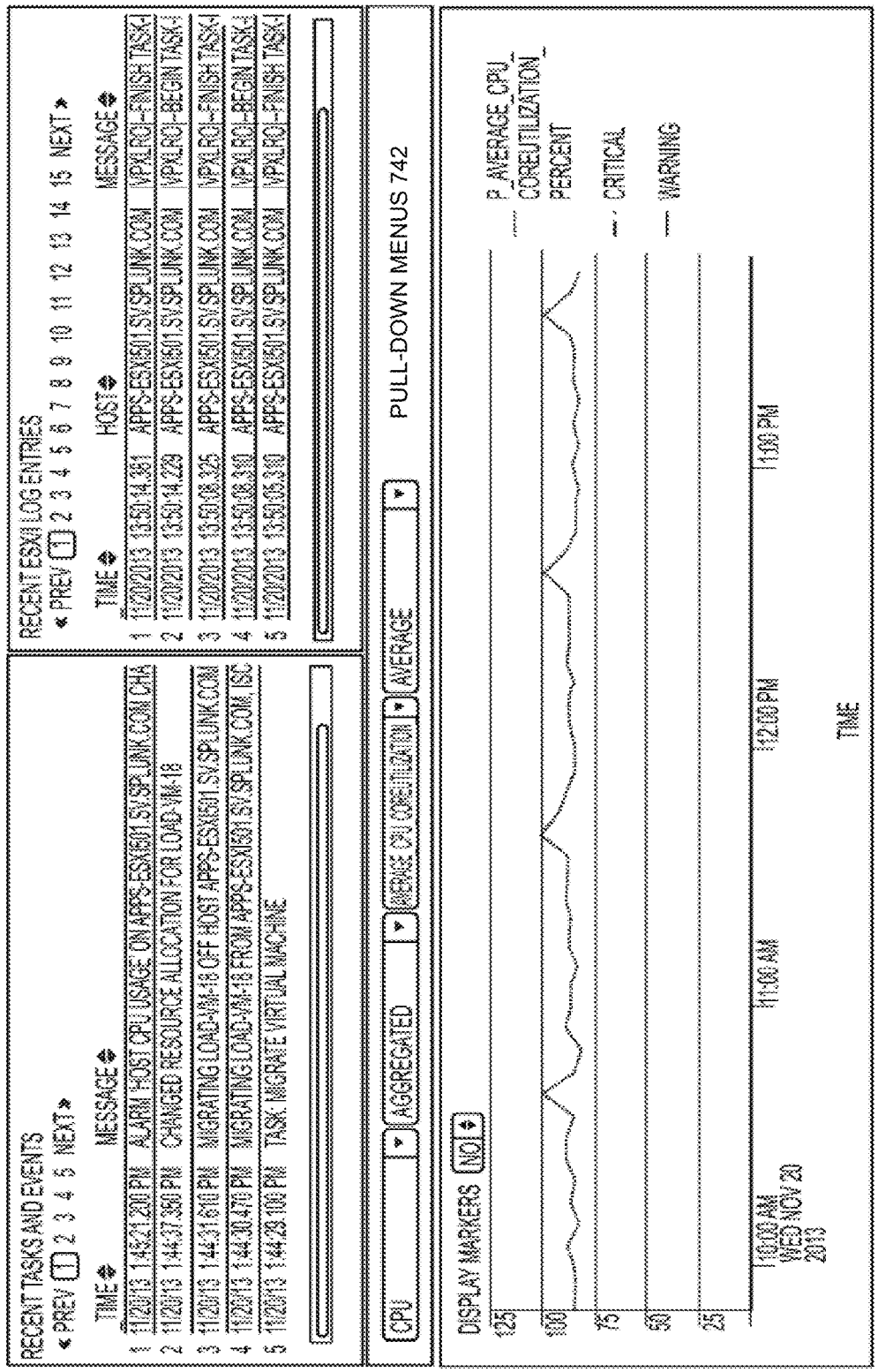
FIG. 12D illustrates a screen displaying both log data and performance data in accordance with one or more aspects of the present disclosure.
Figure 13:
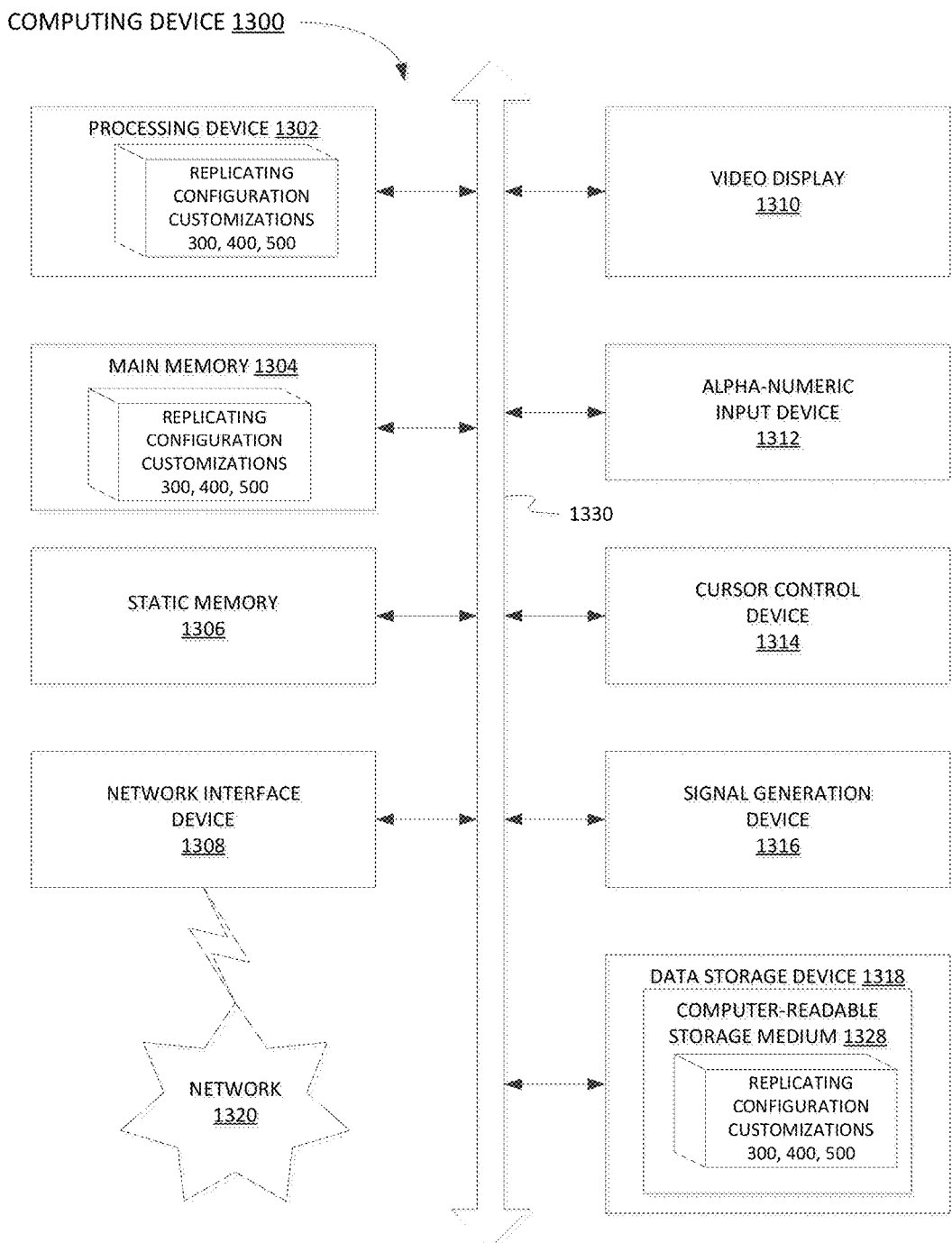
FIG. 13 depicts a block diagram of an example computing device operating in accordance with one or more aspects of the present disclosure.

The SPLUNK® APP FOR VMWARE® also provides a user interface that enables a user to select a specific time range and then view heterogeneous data, comprising events, log data and associated performance metrics, for the selected time range. For example, the screen illustrated in FIG. 12D displays a listing of recent "tasks and events" and a listing of recent "log entries" for a selected time range above a performance-metric graph for "average CPU core utilization" for the selected time range. Note that a user is able to operate pull-down menus 742 to selectively display different performance metric graphs for the selected time range. This enables the user to correlate trends in the performance-metric graph with corresponding event and log data to quickly determine the root cause of a performance problem. This user interface is described in more detail in U.S. patent application Ser. No. 14/167,316 filed on 29 Jan. 2014, which is hereby incorporated herein by reference for all possible purposes.

What is claimed is:

1. A method comprising:
   receiving, by one or more processing devices of a first search head of a cluster comprising a plurality of search heads, a first customization of a knowledge object from a client computing device of a plurality of client computing devices, wherein each search head is responsible for a reduce phase of a map-reduce search computation, and wherein each search head comprises a local data store;
   storing a first journal entry relating to the first customization of the knowledge object in a first local data store of the first search head;
   receiving a second journal entry relating to a second customization of the knowledge object processed by a second search head of the cluster;
   detecting a conflict by determining the first journal entry and the second journal entry share a same parent commit journal entry; and
   resolving the conflict by updating the parent commit journal entry of the first journal entry to a current parent commit, wherein the second customization of the knowledge object is accessible by one or more of the plurality of client computing devices via a user interface associated with the first search head to perform a first map-reduce search computation using the second customization of the knowledge object.

2. The method of claim 1, wherein the second customization of the knowledge object is accessed based on the updated first journal entry stored in the first local data store of the first search head.

3. The method of claim 1, further comprising:
   sending, from the first local data store of the first search head, the journal entry relating to the first customization of the knowledge object to a search head leader selected from the plurality of search heads of the cluster.

4. The method of claim 1, wherein the knowledge object comprising at least one of a late-binding schema, a saved search, an event type, a transaction, a tag, a field extraction, a field transform, a lookup, a workflow action, a search command, or a view.

5. The method of claim 1, wherein the first customization of the knowledge object comprises at least one of a change, update, creation, modification, sharing, permissioning, or deletion relating to the knowledge object.

6. The method of claim 1, wherein each of the plurality of search heads comprises a client interface configured to receive one or more customizations from the plurality of client computing devices.

7. The method of claim 1, wherein each of the plurality of search heads comprises a client interface configured to receive one or more customizations from the plurality of client computing devices and present the one or more customizations shared by the plurality of search heads of the cluster.

8. The method of claim 1, further comprising:
   replicating the first customization of the knowledge object across the plurality of search heads of the cluster via a search head leader of the cluster, wherein the first customization of the knowledge object is communicated via a client interface associated with the second search head of the plurality of search heads of the cluster.

9. The method of claim 1, further comprising:
   updating, by the first search head, a local configuration file of the first local data store by applying the first customization of the knowledge object.

10. The method of claim 1, further comprising performing the map-reduce search computation of source data in accordance with the second customization of the knowledge object, wherein performing the map-reduce search computation comprises applying a late binding schema to the source data, the late binding schema associated with one or more extraction rules defining one or more fields in the source data.

11. The method of claim 1, further comprising performing the first map-reduce search computation of source data in accordance with the second customization of the knowledge object, wherein the source data comprises aggregated heterogeneous data generated by at least one of: a server, a database, an application, or a network.

12. The method of claim 1, further comprising performing the first map-reduce search computation of source data in accordance with the second customization of the knowledge object, wherein the source data includes raw machine data.

13. The method of claim 1, further comprising performing the map-reduce search computation of source data in accordance with the second customization of the knowledge object, wherein the source data comprises a plurality of timestamped events, each timestamped event including a portion of raw machine data.

14. The method of claim 1, wherein sharing the first customization of the knowledge object comprises transmitting the first customization of the knowledge object to a search head leader responsible for synchronization of changes across the plurality of search heads in the cluster, the search head leader having been selected from among the plurality of search heads in the cluster using a Raft consensus algorithm.

15. A system comprising:
   a first local data store of a first search head; and
   a processing device operatively coupled to the first local data store, the processing device to:

receive, by the first search head of a cluster comprising a plurality of search heads, a first customization of a knowledge object from a client computing device of a plurality of client computing devices, wherein each search head is responsible for a reduce phase of a map-reduce search computation, and wherein each search head comprises a local data store;

store a first journal entry relating to the first customization of the knowledge object in a first local data store of the first search head;

receive a second journal entry relating to a second customization of the knowledge object processed by a second search head of the cluster;

detect a conflict by determining the first journal entry and the second journal entry share a same parent commit journal entry; and resolve the conflict by updating the parent commit journal entry of the first journal entry to a current parent commit, wherein the second customization of the knowledge object is accessible by one or more of the plurality of client computing devices via a user interface associated with the first search head to perform a first map-reduce search computation using the second customization of the knowledge object.

16. The system of claim 15, wherein the second customization of the knowledge object is accessed based on the first journal entry stored in the first local data store of the first search head.

17. The system of claim 15, the processing device to:
send, from the first local data store of the first search head, a journal entry relating to the first customization of the knowledge object to a search head leader selected from the plurality of search heads of the cluster.

18. The system of claim 15, wherein the knowledge object comprising at least one of a late-binding schema, a saved search, an event type, a transaction, a tag, a field extraction, a field transform, a lookup, a workflow action, a search command, or a view.

19. The system of claim 18, the processing device further configured to perform the first map-reduce search computation of source data in accordance with the second customization of the knowledge object, wherein the source data comprises a plurality of timestamped events, each timestamped event comprising a portion of raw machine data.

20. The system of claim 15, wherein the first customization of the knowledge object comprises at least one of a change, update, creation, modification, sharing, permissioning, or deletion relating to the knowledge object.

21. The system of claim 15, wherein each of the plurality of search heads comprises a client interface configured to receive one or more customizations from one or more of the plurality of client computing devices.

22. The system of claim 15, wherein each of the plurality of search heads comprises a client interface configured to receive one or more customizations from the plurality of client computing devices and present the one or more customizations shared by the plurality of search heads of the cluster.

23. The system of claim 15, the processing device further configured to replicate the first customization of the knowledge object across the plurality of search heads of the cluster via a search head leader of the cluster, wherein the first customization of the knowledge object is communicated via a client interface associated with the second search head of the plurality of search heads of the cluster.

24. The system of claim 15, the processing device further configured to update a local configuration file of the first local data store by applying the first customization of the knowledge object.

25. The system of claim 15, the processing device further configured to perform the first map-reduce search computation of source data in accordance with the second customization of the knowledge object, wherein performing the first map-reduce search computation comprises applying a late binding schema to the source data, the late binding schema associated with one or more extraction rules defining one or more fields in the source data.

26. The system of claim 15, the processing device further configured to perform the first map-reduce search computation of source data in accordance with the second customization of the knowledge object, wherein the source data comprises aggregated heterogeneous data generated by at least one of: a server, a database, an application, or a network.

27. The system of claim 15, the processing device further configured to perform the first map-reduce search computation of source data in accordance with the second customization of the knowledge object, wherein the source data includes raw machine data.

28. A non-transitory computer-readable medium having instructions encoded thereon which, when executed by a processing device, cause the processing device to perform operations comprising:
receiving, by the processing device of a first search head of a cluster comprising a plurality of search heads, a first customization of a knowledge object from a client computing device of a plurality of client computing devices, wherein each search head is responsible for a reduce phase of a map-reduce search computation, and wherein each search head comprises a local data store;
storing a first journal entry relating to the first customization of the knowledge object in a first local data store of the first search head;
receiving a second journal entry relating to a second customization of the knowledge object processed by a second search head of the cluster;
detecting a conflict by determining the first journal entry and the second journal entry share a same parent commit journal entry; and
resolving the conflict by updating the parent commit journal entry of the first journal entry to a current parent commit, wherein the second customization of the knowledge object is accessible by one or more of the plurality of client computing devices via a user interface associated with the first search head to perform a first map-reduce search computation using the second customization of the knowledge object.

* * * * *